United States Patent
Derkalousdian et al.

(10) Patent No.: US 8,594,365 B2
(45) Date of Patent: Nov. 26, 2013

(54) GAUGE MONITORING METHODS, DEVICES AND SYSTEMS

(75) Inventors: Moses Derkalousdian, San Diego, CA (US); Harry Sim, San Jose, CA (US); Sundaram Nagaraj, San Diego, CA (US); Marcus Kramer, San Diego, CA (US)

(73) Assignee: Cypress Envirosystems, Inc., San Jose, CA (US)

( * ) Notice: Subject to any disclaimer, the term of this patent is extended or adjusted under 35 U.S.C. 154(b) by 930 days.

(21) Appl. No.: 12/322,200

(22) Filed: Jan. 30, 2009

(65) Prior Publication Data

US 2009/0190795 A1    Jul. 30, 2009

Related U.S. Application Data

(60) Provisional application No. 61/024,800, filed on Jan. 30, 2008, provisional application No. 61/024,932, filed on Jan. 31, 2008, provisional application No. 61/033,694, filed on Mar. 4, 2008.

(51) Int. Cl.
*G06K 9/00* (2006.01)

(52) U.S. Cl.
USPC .......................... 382/100; 382/141; 382/152

(58) Field of Classification Search
USPC ......... 382/100, 151, 152, 173, 181, 190–203, 382/287, 289, 291, 294–297
See application file for complete search history.

(56) References Cited

U.S. PATENT DOCUMENTS

| | | | |
|---|---|---|---|
| 4,310,133 A | 1/1982 | Wetterhorn et al. | |
| 4,410,155 A | 10/1983 | Wetterhorn et al. | |
| 4,680,704 A | 7/1987 | Konicek et al. | |
| 4,948,074 A | 8/1990 | Bramhall, Jr. | |
| 5,359,677 A * | 10/1994 | Katsurada et al. | 382/290 |
| 5,542,280 A | 8/1996 | Markow et al. | |
| 5,672,823 A | 9/1997 | Lachmann et al. | |
| 5,673,331 A * | 9/1997 | Lewis et al. | 382/100 |
| 5,870,140 A | 2/1999 | Gillberry | |
| 6,053,043 A | 4/2000 | Dannenberg et al. | |
| 6,085,597 A | 7/2000 | Miller et al. | |
| 6,244,107 B1 | 6/2001 | Nelson et al. | |
| 6,282,969 B1 | 9/2001 | Daniel | |
| 6,314,197 B1 * | 11/2001 | Jain et al. | 382/125 |
| 6,326,896 B1 * | 12/2001 | McDermott et al. | 340/626 |
| 6,529,622 B1 | 3/2003 | Pourjavid | |
| 6,845,177 B2 | 1/2005 | Chiu | |

(Continued)

FOREIGN PATENT DOCUMENTS

WO    WO 2008/079344    7/2008

OTHER PUBLICATIONS

U.S. Appl. No. 12/283,701, Mar. 19, 2009, Kramer et al.
U.S. Appl. No. 11/644,322, filed Jun. 26, 2008, Sim, Harry.

(Continued)

*Primary Examiner* — Jason M Repko
*Assistant Examiner* — Avinash J Yentrapati
(74) *Attorney, Agent, or Firm* — Manuel de la Cerra

(57) ABSTRACT

A method of reading a gauge may include capturing a digital image of the gauge with a gauge reading device attached to the gauge, the digital image comprising a plurality of pixels; determining an angle of a gauge feature based on positions of predetermined pixels of the digital image; and converting the angle into a gauge reading. Gauge reader devices and network based systems are also disclosed.

18 Claims, 16 Drawing Sheets

(56) References Cited

U.S. PATENT DOCUMENTS

| | | | |
|---|---|---|---|
| 6,891,838 B1 | 5/2005 | Petite et al. | |
| 6,938,859 B2 | 9/2005 | Beausoleil | |
| 7,064,678 B2* | 6/2006 | Kim et al. | 340/870.02 |
| 7,151,246 B2 | 12/2006 | Fein et al. | |
| 7,305,664 B2* | 12/2007 | Yamagata | 717/136 |
| 7,450,765 B2* | 11/2008 | Wenzel | 382/209 |
| 7,502,493 B2* | 3/2009 | Ishida | 382/118 |
| 2001/0055425 A1* | 12/2001 | Chiu | 382/199 |
| 2002/0097904 A1* | 7/2002 | White | 382/151 |
| 2003/0016860 A1* | 1/2003 | Sugawara | 382/151 |
| 2003/0030855 A1 | 2/2003 | Honda | |
| 2003/0197882 A1* | 10/2003 | Tsukuba et al. | 358/1.12 |
| 2004/0022435 A1* | 2/2004 | Ishida | 382/190 |
| 2004/0045380 A1 | 3/2004 | Nelson et al. | |
| 2004/0101191 A1 | 5/2004 | Seul et al. | |
| 2004/0150861 A1 | 8/2004 | Van Der Heijden | |
| 2005/0105805 A1* | 5/2005 | Nicponski | 382/216 |
| 2005/0165279 A1 | 7/2005 | Adler et al. | |
| 2006/0178193 A1 | 8/2006 | Hunter | |
| 2006/0212407 A1 | 9/2006 | Lyon | |
| 2006/0238846 A1 | 10/2006 | Alexander et al. | |
| 2007/0005202 A1* | 1/2007 | Breed | 701/29 |
| 2008/0148877 A1* | 6/2008 | Sim | 73/866.1 |

OTHER PUBLICATIONS

U.S. Appl. No. 12/241,171, Sim et al.
USPTO International Search Report of the International Searching Authority, dated Mar. 17, 2009 for International Application No. PCT/USS2009/000643, 2 pages.
USPTO International Written Opinion of the International Searching Authority, dated Mar. 17, 2009 for International Application No. PCT/US2009/000643; 5 pages.
USPTO International Search Report of the International Searching Authority, dated Oct. 1, 2008 for International Application No. PCT/US2008/007607; 5 pages.
USPTO International Written Opinion of the International Searching Authority, dated Oct. 1, 2008 for International Application No. PCT/US2008/007607; 4 pages.
"Item Details: Grainger 1x815 Pressure Transmitter," Internet at <http://www.grainger.com>; 1 page.
USPTO International Search Report of the International Searching Authority, dated Jun. 2, 2006 for International Application No. PCT/US2007/026186; 4 pages.
USPTO International Written Opinion of the International Searching Authority, dated Jun. 2, 2008 for International Application No. PCT/US2007/026186; 7 pages.
"A-D converter the hard (but cheap!) way", Internet at http://www.eissq.com/DialADC.html#Matlabcode.

* cited by examiner

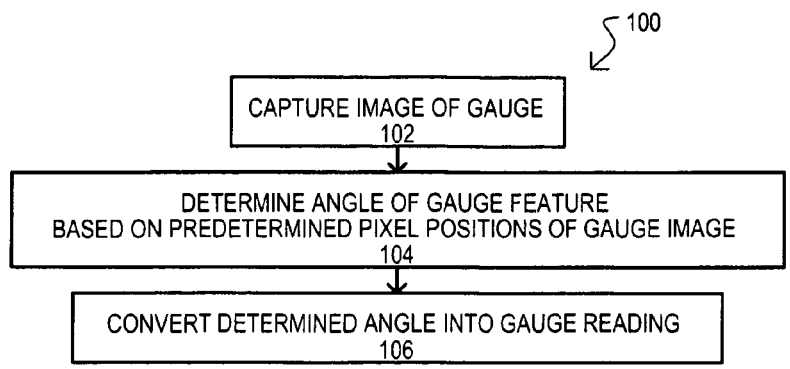
FIG. 1
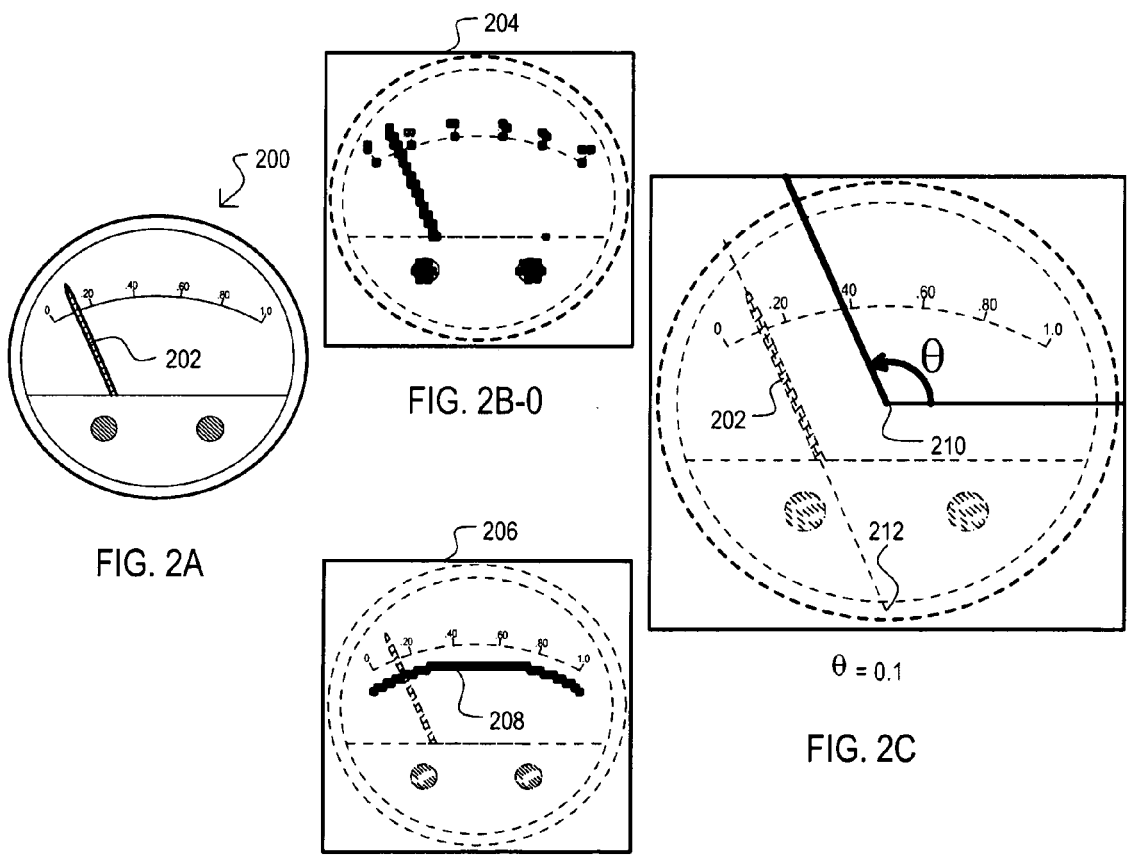
FIG. 2A
FIG. 2B-0
FIG. 2B-1
FIG. 2C
$\theta = 0.1$

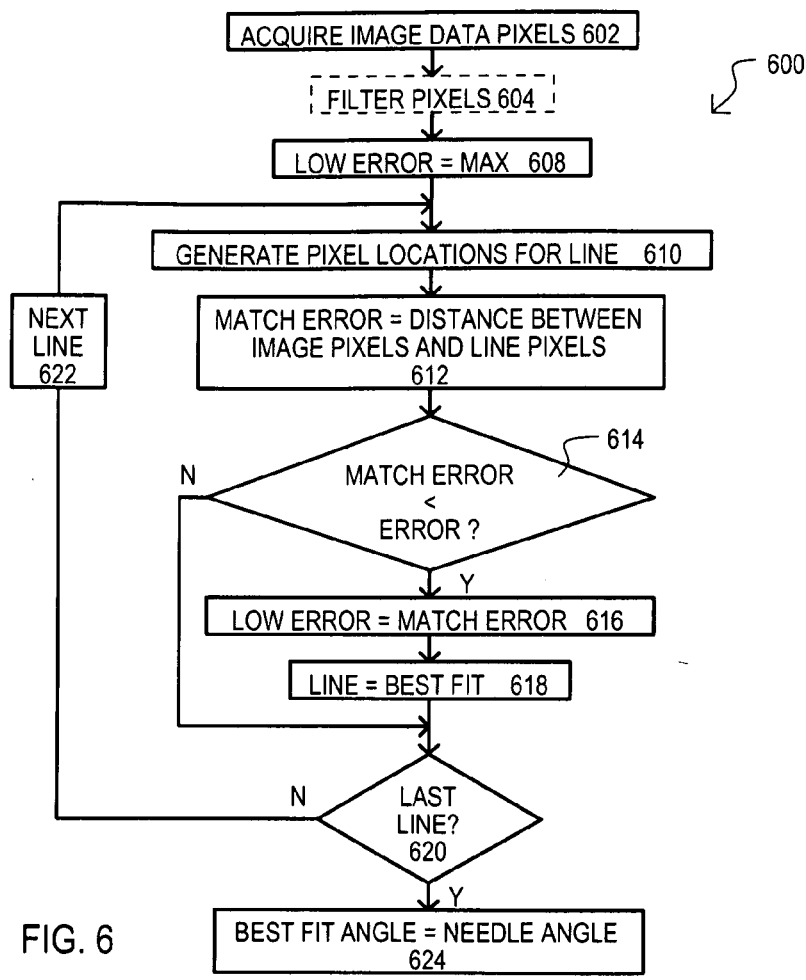
FIG. 6
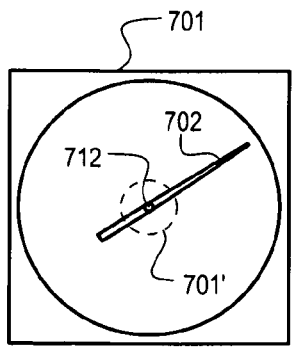
FIG. 7A
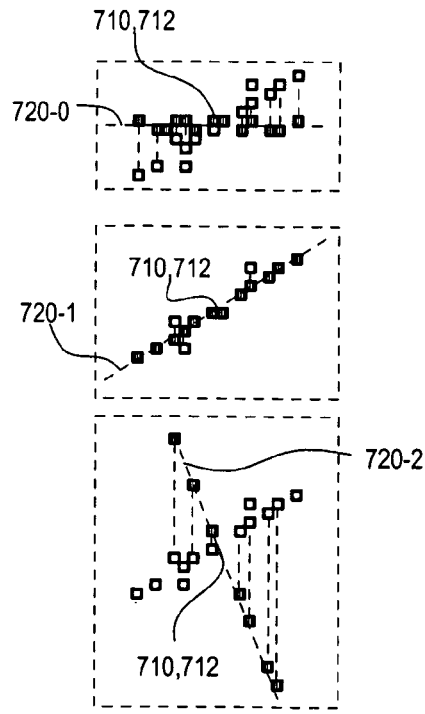
FIG. 7B
FIG. 7C
FIG. 7D

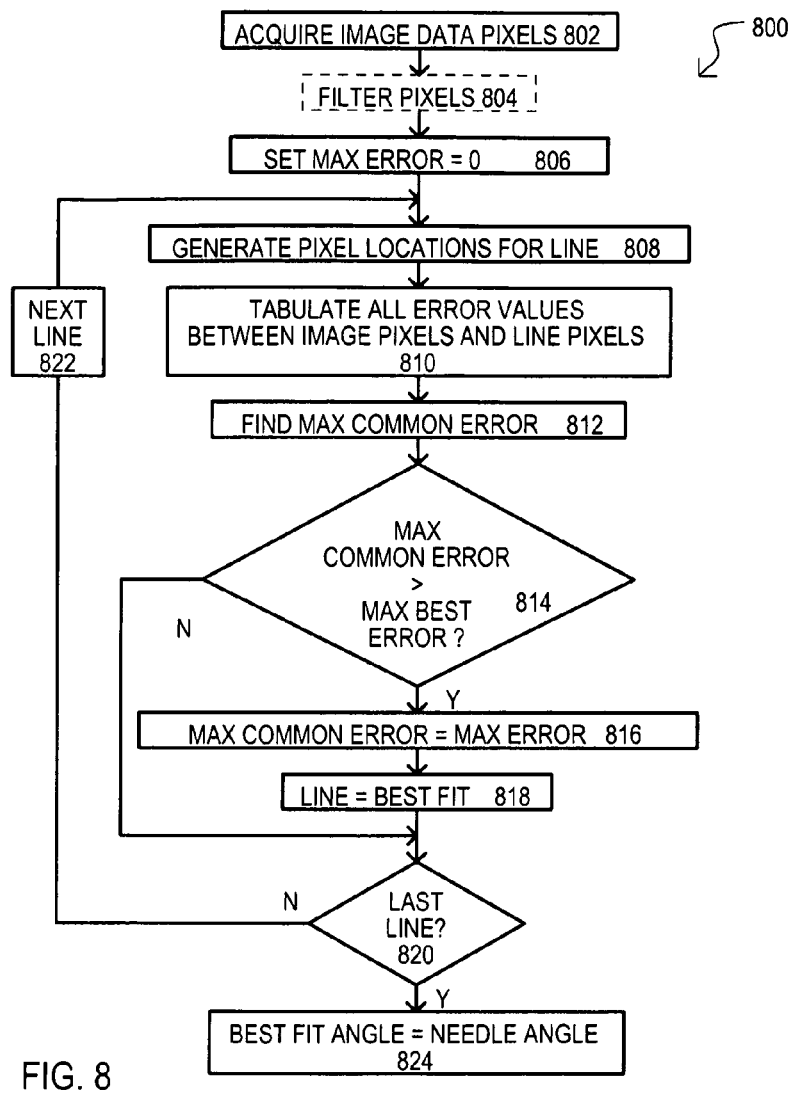
FIG. 8
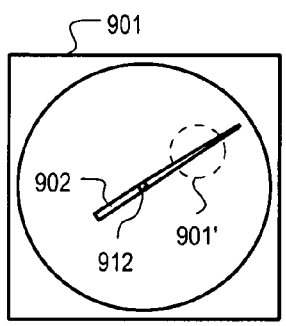
FIG. 9A
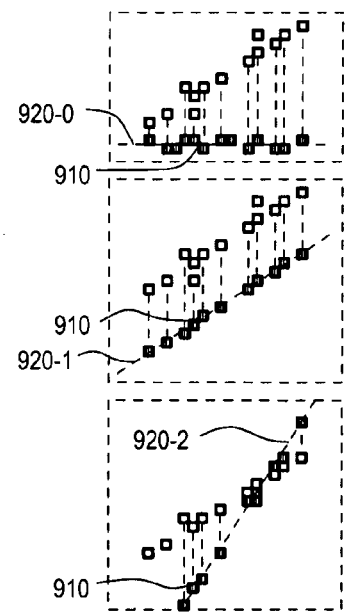
FIG. 9B
FIG. 9C
FIG. 9D

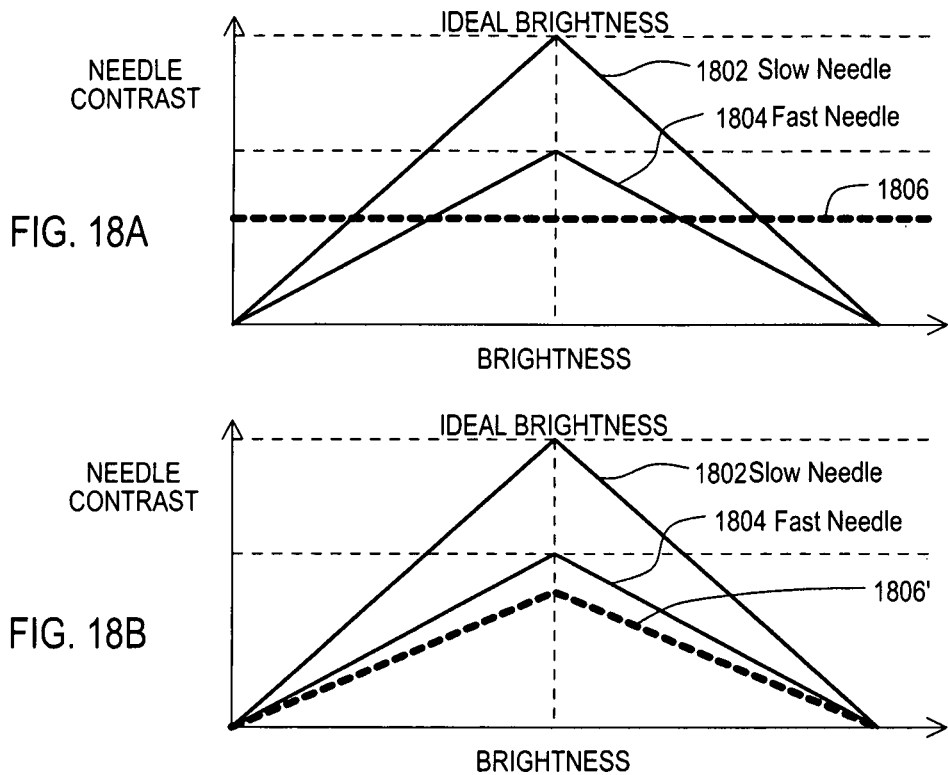
FIG. 18A
FIG. 18B
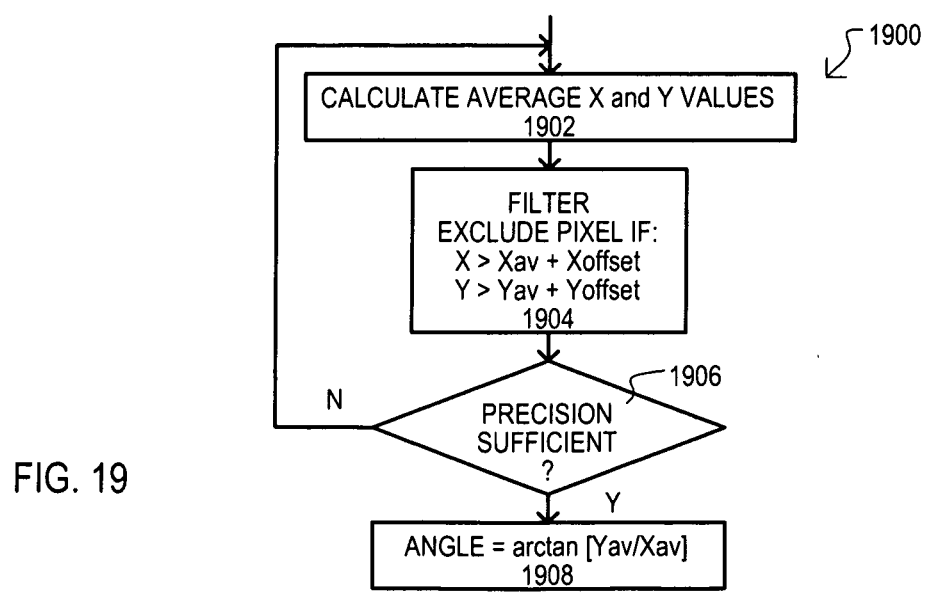
FIG. 19

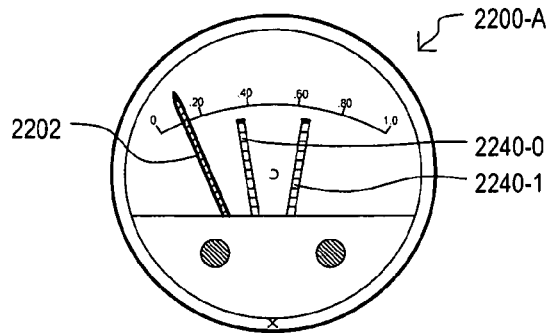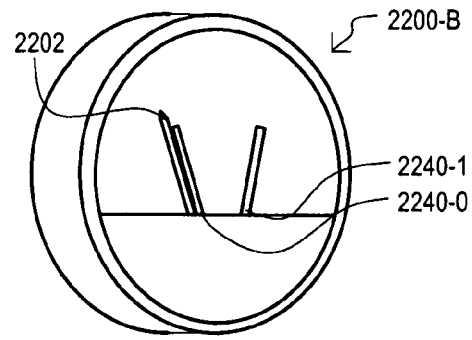
FIG. 22A  FIG. 22B
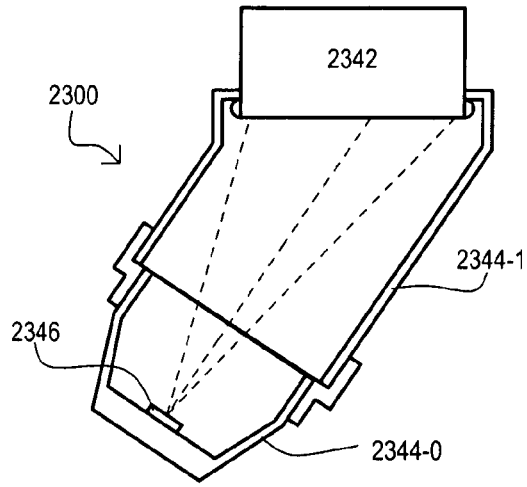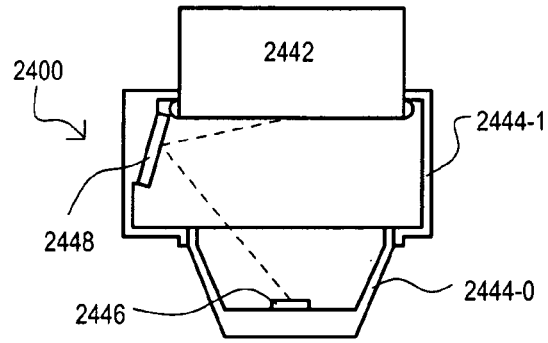
FIG. 23  FIG. 24
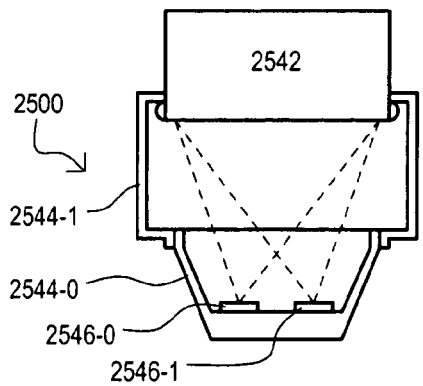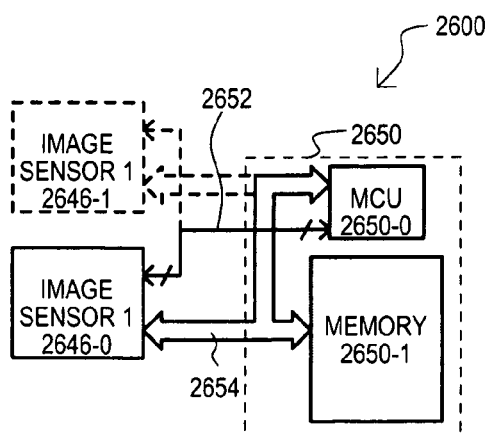
FIG. 25  FIG. 26

US 8,594,365 B2

GAUGE MONITORING METHODS, DEVICES AND SYSTEMS

This application claims the benefit of U.S. provisional patent applications, including Ser. No. 61/024,800 filed on Jan. 30, 2008, Ser. No. 61/024,932 filed on Jan. 31, 2008, and 61/033,694 filed on Mar. 4, 2008. The contents of all of these applications are incorporated by reference herein.

TECHNICAL FIELD

The present disclosure relates to devices and methods for acquiring a digital image of a gauge and generating a gauge reading from pixels positions of such an image.

BACKGROUND

Industrial and other facilities may include monitor and/or control devices, such as gauges to track parts of processes or systems. Readings from such devices are periodically taken to ensure such processes/systems are operating as desired. This can consume considerable time and manpower.

Systems may be upgraded by replacing an entire device (e.g., gauge) with a replacement device having a built in transmitting capability. A drawback to such an approach can be that replacement of an entire gauge can be invasive. In the event the gauge is utilized in an active process, the process may have to be shut down entirely as the gauge is replaced with a transmitting unit. Further, once a transmitting unit is installed, such a unit may have to be leak tested and also tested to ensure it is transmitting a correct signal. In addition, a transmitting unit may require wiring from the transmitter to a central location. This can require additional labor, and assumes suitable wiring paths are available at the site.

BRIEF DESCRIPTION OF THE DRAWINGS

FIG. 1 is a flow diagram of a method according to an embodiment.

FIGS. 2A to 2C are diagrams showing embodiments of a method like that of FIG. 1.

FIG. 6 is a flow diagram of a method according to an embodiment.

FIGS. 7A to 7D are diagrams showing embodiments of a method like that of FIG. 6.

FIG. 8 is a flow diagram of a method according to an embodiment.

FIGS. 9A to 9D are diagrams showing embodiments of a method like that of FIG. 8.

FIGS. 18A and 18B are diagrams showing gauge needle pixel filtering according to embodiments.

FIG. 19 is a flow diagram of a method according to an embodiment.

FIGS. 22A and 22B are diagrams showing gauge images according to embodiments.

FIG. 23 is a cross sectional view of a gauge reader according to an embodiment.

FIG. 24 is a cross sectional view of a gauge reader according to an embodiment.

FIG. 25 is a cross sectional view of a gauge reader according to an embodiment.

FIG. 26 is a block schematic diagram of a gauge reader according to an embodiment.

DETAILED DESCRIPTION

Figure 3A:
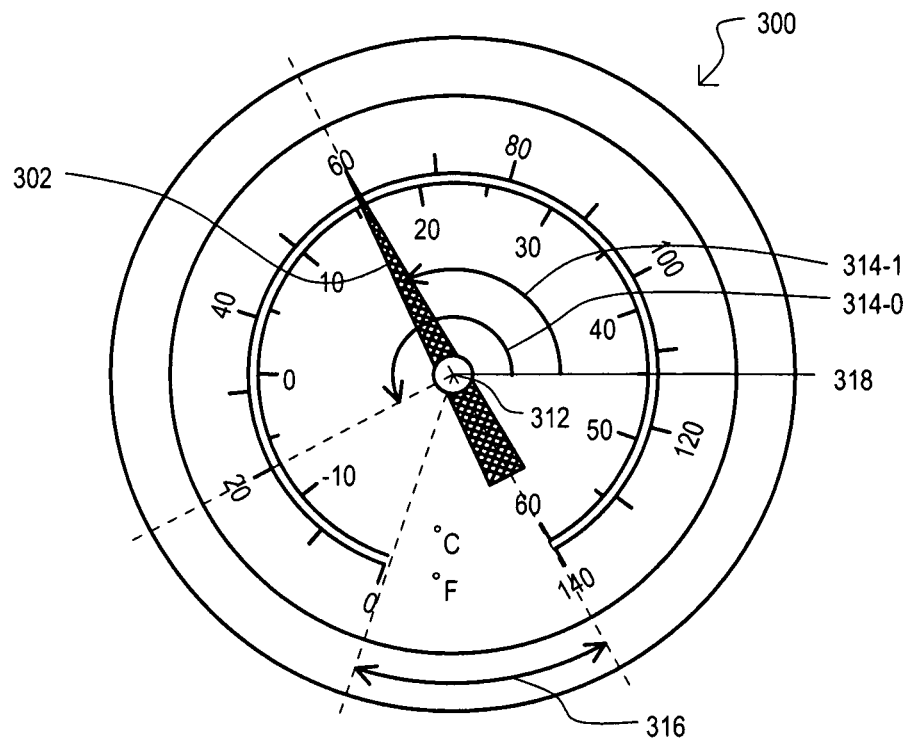
FIGS. 3A and 3B are diagrams showing angle conversions according to particular embodiments.

Various embodiments will now be described that show devices and methods for acquiring a reading from a gauge image. In particular embodiments, an angle of a feature on a gauge may be determined, and such an angle may then be transformed into reading for the gauge.

Referring to FIG. 1, a method for generating a gauge reading is shown in a flow diagram, and designated by the general reference character 100. A method 100 may include capturing an image of a gauge (box 102). Such an action may include capturing a digital image of a gauge that includes a plurality of pixels. Such pixels may be all or a majority of an image acquisition area. Alternative, such an image may be a limited region of an image capture area (i.e., a region of interest or "ROI").

Very particular embodiments of capturing an image according to embodiments are shown in FIGS. 2A to 2B-1. FIG. 2A shows one very particular embodiment of a gauge 200. Gauge 200 may include a feature that may change in angular orientation to represent different readings. In the particular gauge shown, such a feature may be needle 202. FIG. 2B-0 shows a "full" image 204 of gauge 200 according to an embodiment. A majority of a gauge face has been captured as a number of pixels. Pixels may be filtered to distinguish features. As but a few of the many possible embodiments, features may be filtered based on luminosity, change in luminosity between pixels, and/or color. FIG. 2B-1 shows an ROI image 206 of gauge 200 according to an embodiment. Only an ROI 208 portion of a gauge image is acquired (or stored or analyzed after acquisition). More particular embodiments of image acquisition, filtering and processing will be described in conjunction with other embodiments shown herein.

Referring back to FIG. 1, a method 100 may further include determining an angle of gauge feature based on predetermined pixel positions of a gauge image (box 104). Such an action may include determining a line having an angle which best fits a feature of the gauge, or determining a point from one or more pixels from which an angle may be calculated with respect to an anchor point, as but two embodiments.

A very particular embodiment of an angle determination for the embodiments of FIGS. 2A to 2B-1 is shown in FIG. 2C. FIG. 2C shows an angle θ superimposed on a gauge image. Angle θ matches an angle of needle 202. It is noted that in the particular embodiment of FIG. 2C, a processing anchor point 210 (a point about which an angular determination is made) may be different from an image anchor point 212 (a point about which a gauge feature (e.g., needle) rotates. However, in alternate embodiments processing anchor point 210 and image anchor point 212 may be the same.

Referring again to FIG. 1, method 100 may also include converting a determined angle into a gauge reading (box 106). Such a step may include having a predetermined correlation between angles and readings, and generating a reading based on such a correlation. As but a few embodiments, such a correlation may be a mathematical relationship (i.e., Reading=Angle*scale+offset) determined by a processor, or a look-up table (LUT), or dedicated logic.

Figure 3B:
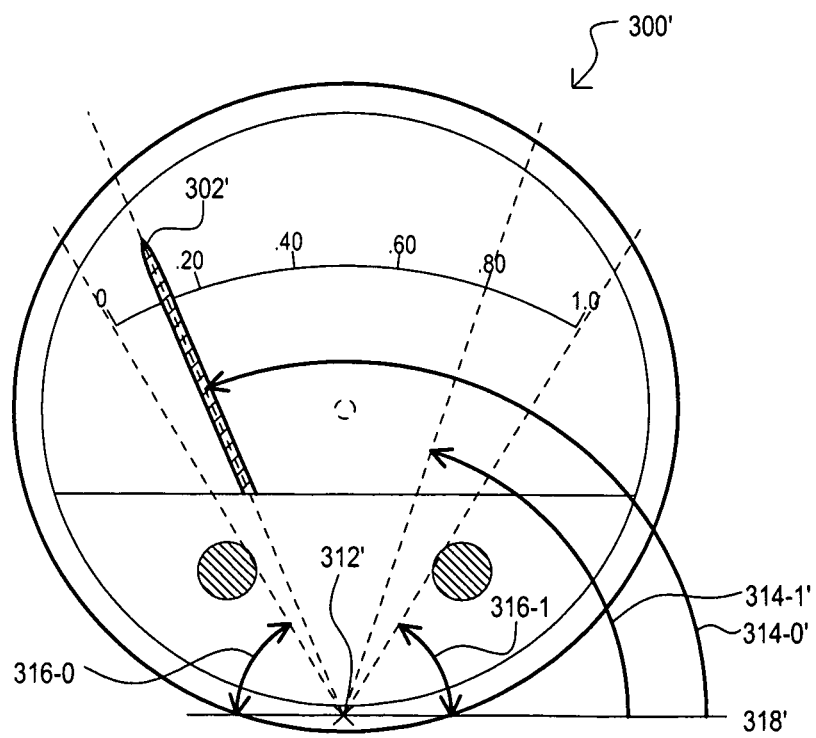

FIGS. 3A and 3B are diagrams showing how an angle may be transformed into a gauge reading. FIG. 3A shows a gauge 300 having needle 302 that rotates about an image anchor point 312. As understood, with respect to a reference position 318, an angle 314-0 corresponds to a reading of 20° F. An angle 314-1 corresponds to a reading of 60° F. Angles in invalid range 316 may be considered invalid angles, as they do not correspond to any reading. FIG. 3B shows another gauge 300' having a needle 302' that rotates about an image anchor position 312'. Unlike FIG. 3A, anchor position 312' is not located in a central portion of gauge 300'. Further, visible portions of needle 302' do not intersect image anchor position 312'. FIG. 3B shows how an angle 314-0' may be transformed into a reading "0.10", while an angle 314-1' may be transformed in a reading "0.80". FIG. 3B also shows regions 316-0 and 316-1 that may be considered invalid angle regions.

In particular embodiments, a gauge may be examined to determine the particular angle-to-reading conversion. More particularly, a gauge reader device may be attached to a gauge, a gauge image may be acquired, and from such an image, angle to reading conversion may be determined manually, or automatically.

In this way, a method may convert a gauge image of a physical gauge into a gauge reading based on pixel positions in the gauge image.

Referring now to FIGS. 4 and 5A to 5D, one particular embodiment of an angle determination method is shown in a flow diagram and designated by the general reference character 400. In very particular embodiments, method 400 may correspond to box 104 shown in the method of FIG. 1.

Figure 4:
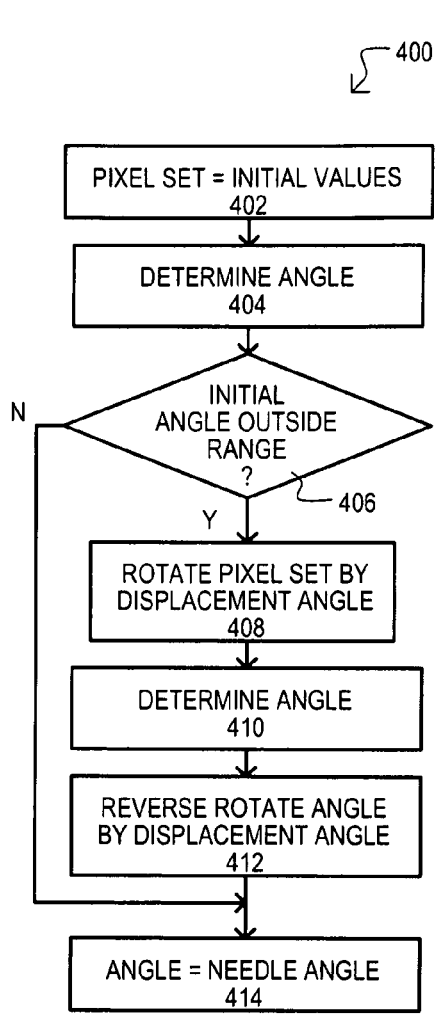
FIG. 4 is a flow diagram of a method according to an embodiment.

Referring to FIG. 4, a method may include determining a pixel set from initial pixel values of a gauge image (box 402). In one embodiment, positions of pixels having a particular luminosity (e.g., darkest or lightest pixels) may be stored. An angle corresponding to such pixels may then be determined (box 404). In one very particular embodiment, an ordinary least squares (OLS) method may be used to generate a best line fit. An angle of such a best line may be an initial angle. In other embodiments, other conventional line fitting methods may be used.

A method 400 may also include determining if an initial angle is within a predetermined range (box 406). In one embodiment, such a range may be based on known accuracies of actions performed in box 404. In another embodiment, an OLS approach may be used to determine a line angle in box 404, and a range may be +45° to −45° with respect to a horizontal axis used in such an OLS determination.

Figure 5A:
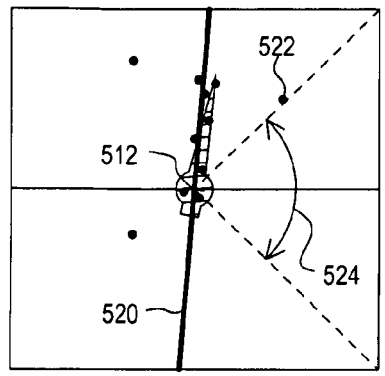
FIGS. 5A to 5D are diagrams showing embodiments of a method like that of FIG. 4.

FIG. 5A is a diagram showing operations on a particular gauge image following box 404 of method 400. An initial line 520 may be derived from pixel locations of a set (shown by "dots", one identified as 522). FIG. 5A also shows an angle range 524 to which line 520 may be compared. In the embodiment shown, an angle range 524 may be from +45° to −45°, which may be a range at which OLS may have a high degree of accuracy.

Figure 5B:
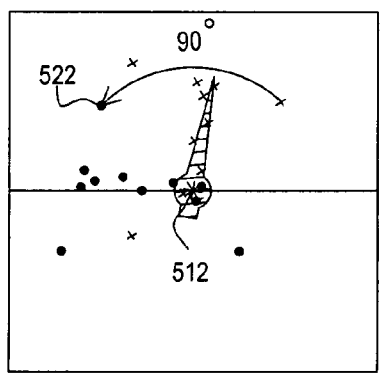

As shown in FIG. 4, if an initial angle is outside of a range (Y from box 406), the pixel set may be rotated by a displacement angle. In one embodiment, an amount of angular displacement may also be based on known accuracies of actions performed in box 404. FIG. 5B is a diagram showing operations on a gauge image from FIG. 5A, following box 408 of method 400. The set of pixels (e.g., 524) are rotated from original positions (shown by crosses). In the embodiment shown, a displacement angle may be +90°, which may be suitable when OLS approaches are used in box 404.

Figure 5C:
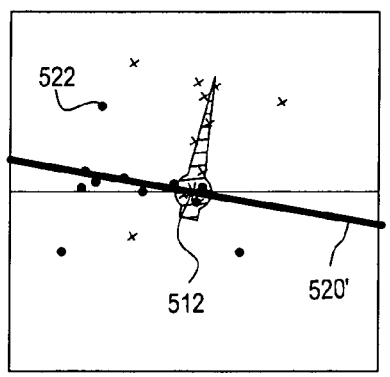

Referring back to FIG. 4, a method 400 may include another line determination action (box 410). Such an action may utilize any of the method described in conjunction with box 404. In a particular embodiment, such an operation may result in more accurate regression results, than that based on non-rotated data. FIG. 5C is a diagram showing operations on a gauge image from FIG. 5A, following box 410 of method 400. A line 520' may be derived from rotated pixel locations.

Figure 5D:
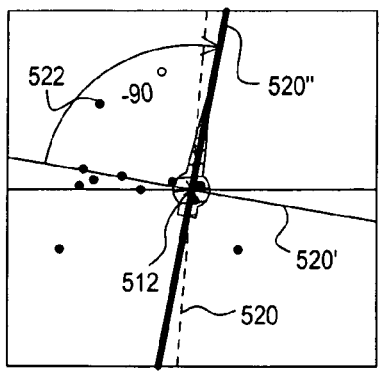

A method 400 may include reverse rotating a newly derived line by the displacement angle (box 412). That is, a newly calculated line may be rotated by an angular opposite to those used to rotate pixel data in box 408. FIG. 5D is a diagram showing operations on gauge data from FIG. 5A following box 412 of method 400. A line 520' may be rotated (in this embodiment by −90°) to arrive at line 520".

It is noted that in FIGS. 5A to 5D, an image anchor point 512 is the same as a processing anchor point for calculating line angles and rotating pixel positions. Further, initial line 520 is included in FIG. 5D for comparison with adjusted 520" line.

As shown in FIG. 4, if an initial line was within an angular range (N from box 406), or a new line is generated by rotating data (box 412), an angle of such a line may be selected as an angle of a gauge reading.

In this way, if an initial line is outside of a predetermined angular range, pixel data corresponding to a gauge may be rotated to calculate a new line. Such a new line may be rotated back to give an angle for a gauge reading. Such an arrangement may ensure that less accurate pixel orientations are avoided when deriving a gauge angle.

Referring now to FIGS. 6 and 7A to 7D, another particular embodiment of an angle determination method is shown in a flow diagram and designated by the general reference character 600. In very particular embodiments, method 600 may correspond to box 104 shown in the method of FIG. 1.

Referring to FIG. 6, a method may include calculating positions for lines, ranging from 0-179°, and comparing positions of such lines to corresponding pixel positions. Once a best fit line (least position error) has been determined, an angle of such a line may be determined to be a gauge needle angle. This method will be referred to herein as a least sum of error (LSE) method.

The particular embodiment of FIG. 6 includes acquiring image data pixels (box 602). In very particular embodiments, such a step may include determining which pixels meet a particular luminosity requirement (e.g., are darker than an average luminosity or some other predetermined limit).

Optionally, image data pixels may be filtered (box 604) to further reduce a number of pixels used in a line determination method. A low error value (to be discussed in more detail below), may be set to some maximum value (box 608).

Pixel locations may then be generated for a line (box 610). Such a step may generate particular pixel locations for a line having an angle. In one particular embodiment, a method 600 may start at a line at 0° and then step through at 10 increments to 179°. In other embodiments, an initial line may be based on a search approach, with an initial set of lines (having a predetermined angular separation) may be tested for a fit against pixel data. Once a closest fit is found for one of the lines of the initial set, additional testing may be performed at finer increments.

In one particular embodiment, each pixel of the acquired pixel data may have an X and Y coordinate. Pixel locations of a line (as described for box 610) may be generated for each X location of a pixel value. A single multiplication step (based on line slope) may be used to generate the corresponding Y value for each X location.

Referring back to FIG. 6, a match error value may be generated that corresponds to a distance between image pixels and corresponding line pixel locations (box 612). In one particular embodiment, such an operation may include determining an absolute value between a Y position of an image pixel and the Y position of the line pixel at a same X location. Alternatively, both X and Y differences between the data sets may be summarized to arrive at a match error value.

A match error (representing an error between a current line and image data) may then be compared to a low error value, first noted for box 608 (box 614). If a current match error is less than a stored low error (Y from 614), the current match error may become the new low error (box 616). A line corresponding to such a new low error may be stored as a current best fit line (box 618). If a last line has not been reached (N from box 620), position values for a next line may be generated (box 622). Such a next line may be rotated with respect to a previous line. As noted above, the increment for such a rotation may be relatively large (initial search approach) or small (sequentially rotate through all angles, or subsequent fine search).

If a last line has been reached (Y from box 620), an angle currently stored as a best fit line may be a needle angle.

It is noted that in a method like that of FIG. 6, an anchor point for lines may be the same as that of gauge data.

FIGS. 7A to 7D show one very particular embodiment of a method of FIG. 6. Referring to FIG. 7A, a gauge 701 is shown that includes a needle 702 that may rotate around an image anchor point 712. Image data from a portion of gauge 701', along with examples of fit line data, are shown in FIGS. 7B to 7D.

FIG. 7B shows image pixel data representing a gauge needle position and positions of an initial line 720-0. Pixel data positions are shown by open squares. Line position data is shown by filled squares, with the line also being represented with a dashed line. In the particular embodiment shown, Y positions are compared. Differences between Y positions of line data and pixel data are shown by dashed lines.

FIG. 7C shows image pixel data representing a gauge needle position and positions of another line 720-1. Line position data is shown once again by filled squares. In the particular embodiment shown, Y positions are compared once again, and are shown by dashed lines. As shown by comparison between FIGS. 7B and 7C, line 720-1 will have a much smaller error than line 720-0, and thus represents a better fit than line 720-0.

FIG. 7D shows image pixel data representing a gauge needle position and positions of a third line 720-2. Line position data and differences in position are the same as FIGS. 7B and 7C. As shown by comparison between FIGS. 7C and 7D, line 720-2 will have a much greater error than line 720-1, and thus represents a worse fit than line 720-1.

It is noted that FIGS. 7B to 7D show a match between image anchor point 712 and processing anchor point 710.

In other embodiments, a method like that of FIG. 6 may also include a method like that of FIG. 4. That is, each line determination step may further include rotating pixel data points if a best matching line angle is outside of a predetermined angular range. A new best fit line may then be calculated from such rotated data. A resulting new best fit line may then be rotated back to arrive at a final best line fit.

In this way, gauge image pixel data may be compared against a sequence of rotated lines to find a line having a minimum error with pixel data. An angle of such a line may then be determined to be a gauge needle angle.

Referring now to FIGS. 8 and 9A to 9D, another particular embodiment of an angle determination method is shown in a flow diagram and designated by the general reference character 800. In very particular embodiments, method 800 may correspond to box 104 shown in the method of FIG. 1.

Referring to FIG. 8, a method may include calculating positions for lines, ranging from 0-179°. Positions of such lines can be compared to corresponding pixel positions. A line having a largest occurrence of the same or similar error amount between line and image positions may be considered to be parallel to an image needle. Consequently, an angle of the line may be considered an angle of a gauge. This method will be referred to herein as a maximum common error (MCE) method.

The particular embodiment of FIG. 8 includes acquiring image data pixels (box 802) and, optionally, filtering such pixels (box 804). Such operation may occur in the same or equivalent manner as boxes 602 and 604 of FIG. 6. A max error value may then be set to zero (box 806). A max error value will be discussed in more detail below.

Pixel locations may then be generated for a line (box 808). Such actions may occur in the same or equivalent manner as box 610 of FIG. 6.

A method 800 may further include tabulating error values between line positions and pixel data positions (box 810). That is, a tally may be made that will indicate a most common distance error between line and gauge image pixels.

From tabulated error values, a maximum common error may be determined (box 812). Such an action may determine which tabulated error has most counts. In one embodiment an error count may be a largest count from all counts. In other embodiments, a largest count may be an average from a sliding window that combines similar errors into a single count value. A sliding window approach may be more robust with respect to noise. Such a maximum common error may then be compared to a max error value, first noted for box 806 (box 814). If a current max common error is greater than a stored max error (Y from 814), the current max common error may become the new max error (box 816). A line corresponding to such a new max error may be stored as a current best fit line (box 818). If a last line has not been reached (N from box 820), position values for a next line may be generated (box 822). Such a next line may be rotated with respect to a previous line. As noted above, the increment for such a rotation may be large (initial search approach) or small (sequentially rotate through all angles, or fine search).

If a last line has been reached (Y from box 820), an angle of a currently stored best fit line may be a needle angle.

It is noted that in a method like that of FIG. 8, an anchor point for lines may be entirely different as that for gauge image data. This is illustrated in FIGS. 9A to 9D by comparing location of point 912 with 910.

FIGS. 9A to 9D show one very particular embodiment of a method of FIG. 8. Referring to FIG. 9A, a gauge 901 is shown that includes a needle 902 that may rotate around an image anchor point 912. Image data from a portion of gauge 901 with various line data positions is shown in FIGS. 9B to 9D.

FIG. 9B shows image pixel data representing a gauge needle position and positions of an initial line 920-0. Pixel data positions are shown by open squares. Line position data is shown by filled squares, with the line being projected with a dashed line. In the particular embodiment shown, Y positions are compared. Differences between Y positions of line data and pixel data are shown by dashed lines.

FIG. 9C shows image pixel data representing a gauge needle position and positions of a second line 920-1. Line position data is shown once again by filled squares. In the particular embodiment shown, Y positions are compared once again, and are shown by dashed lines. As shown by comparison between FIGS. 9B and 9C, error differences between line 920-1 and pixel data is much closer, so a common error number is likely to be the same for many X locations. Accordingly, line 920-1 represents a better fit than line 920-0.

FIG. 9D shows image pixel data representing a gauge needle position and positions of a third line 920-2. Line position data and differences in position are the same as FIGS. 9B and 9C. As shown by comparison between FIGS. 9C and 9D, line 920-2 will have a much greater variation in errors than line 920-1, and thus represents a worst fit than line 920-1.

It is noted that FIGS. 9B to 9D show how an image anchor point 912 may be different than a processing anchor point 910.

In this way, gauge image pixel data may be compared against a sequence of rotated lines to find a line having a maximum common error with pixel data. An angle of such a line may then be determined to be a gauge needle angle.

While embodiments may utilize LSE and MCE techniques as noted above, still other embodiments may combine MCE and LSE techniques to transform gauge image pixel data into a gauge needle reading. One particular embodiment of such an arrangement is shown in FIG. 10.

Figure 10:
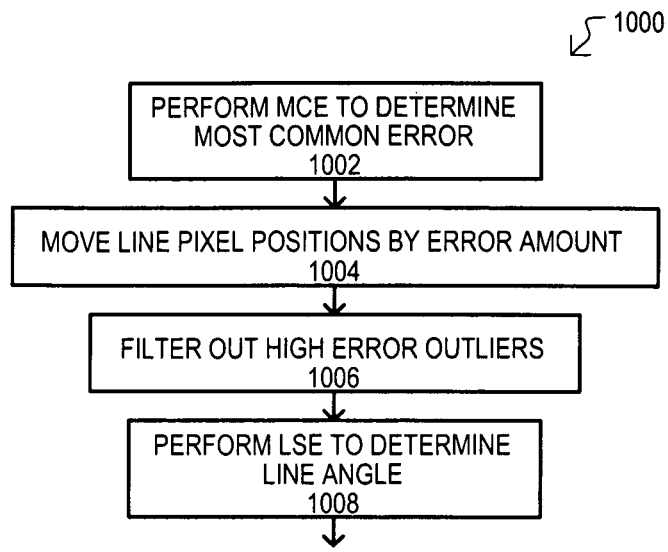
FIG. 10 is a flow diagram of a method according to an embodiment.

Referring to FIG. 10, a method for determining a gauge image angle is shown in a flow diagram and designated by the general reference character 1000. In very particular embodiments, method 1000 may correspond to box 104 shown in the method of FIG. 1.

As shown in FIG. 10, a method 1000 may include performing an MCE analysis (box 1002). Such an action may include performing an analysis like any of those shown in the embodiments of FIGS. 8 and 9A to 9D, or equivalents. Such an analysis may yield a maximum common error value for a best fit line and gauge pixel positions.

Line pixel positions may then be shifted by a maximum common error value (box 1004). Such an action may align a generated line over pixel data. Optionally, pixels may be filtered based on MCE results to arrive at a sub-set of pixels (box 1006) that may eliminate "outliers", which may be image pixels arising from noise, or features unrelated to a gauge needle position.

An LSE analysis may then be performed between locations of pixel image data (which may be filtered) and the shifted line data locations (box 1008). Such an action may include performing an analysis like any of those shown in the embodiments of FIGS. 6 and 7A to 7D, or equivalents.

In this way, LSE and MCE approaches may be combined to transform gauge image pixel data positions into a reading for the gauge.

Figure 11A:
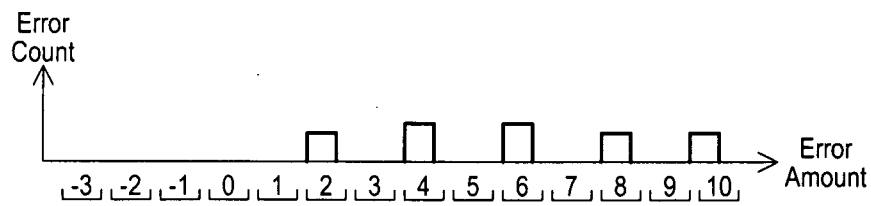
FIGS. 11A and 11B are histograms showing pixel data classification according to an embodiment.
Figure 11B:
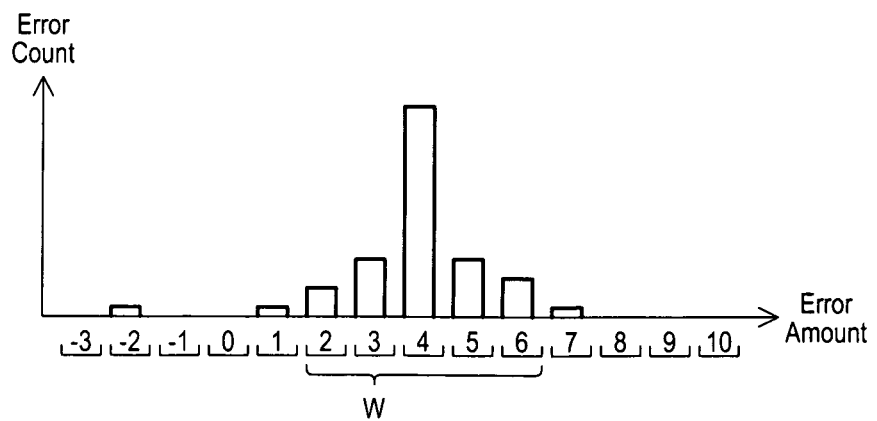

Referring to FIGS. 11A and 11B, embodiments of error histograms that may be generated in an MCE analysis according to particular embodiments are shown. Histograms may be physically implemented as arrays in a memory of a gauge reader device.

FIG. 11A shows a first error histogram. Such a histogram may correspond to a gauge pixel-to-line correlation like that shown in FIG. 9B. Errors are positive and evenly distributed. Thus, while an error amount of "4" may have a largest count, it is not significantly larger than other error counts.

FIG. 11B shows another error histogram. Such a histogram may correspond to a gauge pixel-to-line correlation like that shown in FIG. 9C. There is a clear maximum common error (4), and other errors are clustered about such a maximum common error value. As noted above, a window (W) may be used to filter out "outlier" pixel values. Thus, in the very particular embodiment shown, pixels having distance errors greater than 1 and less than 7 may be retained. The remaining pixels (corresponding to error <2 or >6) may be discarded in a subsequent analysis.

In this way, MCE results may be filtered to eliminate "outlier" pixels of a gauge image.

While embodiments like those of FIGS. 4-10 may analyze pixel values taken from all, or a majority of an image area of a gauge, alternate embodiments may base analysis on a predetermined region of an image, referred to above as an ROI. An ROI may be a small portion of an image that is retained for analysis (after a larger image has been acquired), or alternatively, may be the only pixels values acquired. Two very particular embodiments of ROIs for a gauge are shown in FIGS. 12A and 12B.

Figure 12A:
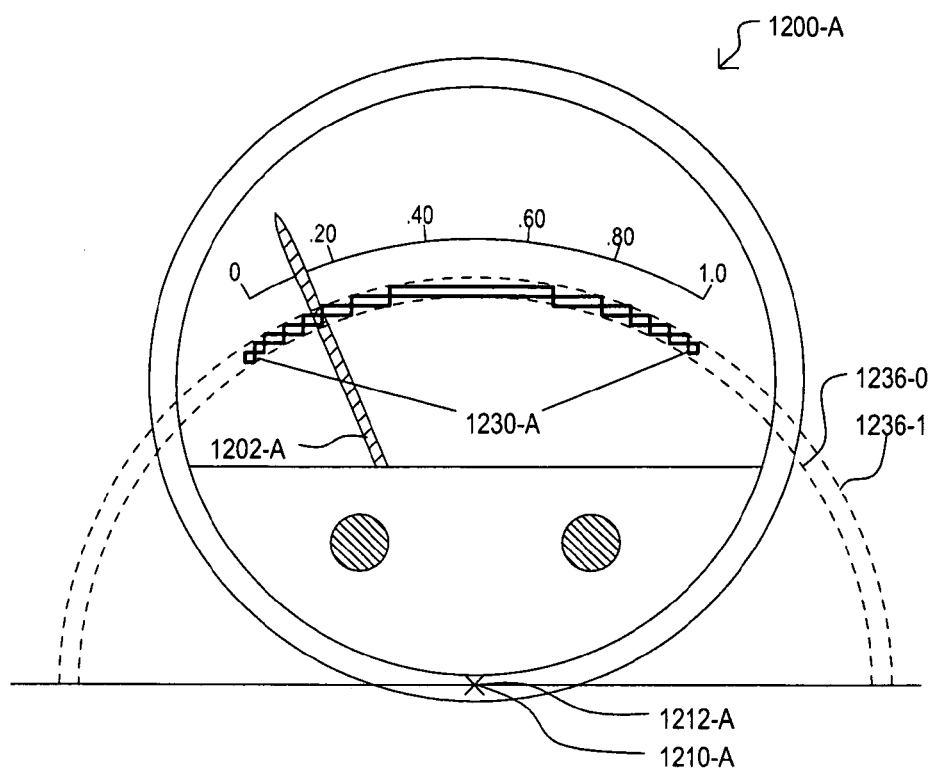
FIGS. 12A and 12B are diagrams showing regions of interest (ROI) in a gauge image according to embodiments.

FIG. 12A shows a gauge 1200-A having a needle 1202-A. A needle 1202-A may rotate about a location 1212-A, which may be an image anchor point. Such a point may also be a processing anchor point 1210-A as it may be utilized to determine a final angle, as will be described below. In the particular embodiment shown, an ROI 1230-A may be a region defined by concentric circles 1236-0 and 1236-1. In the particular embodiment shown, circles (1236-0 and 1236-1) may only overlap a needle 1202 within a gauge image. Further, in the embodiment shown, circles (1236-0 and 1236-1) may have centers aligned at image anchor point 1212-A. Said in another way, radii of circles (1236-0 and 1236-1) may be larger than a radius of a monitored gauge (assuming a gauge shape is circular).

In some arrangements, defining a ROI with concentric circles may not be possible due to background features of a gauge face. Accordingly, in alternate embodiments, an ROI may be defined by one or more line segments. One such embodiment is shown in FIG. 12B.

Figure 12B:
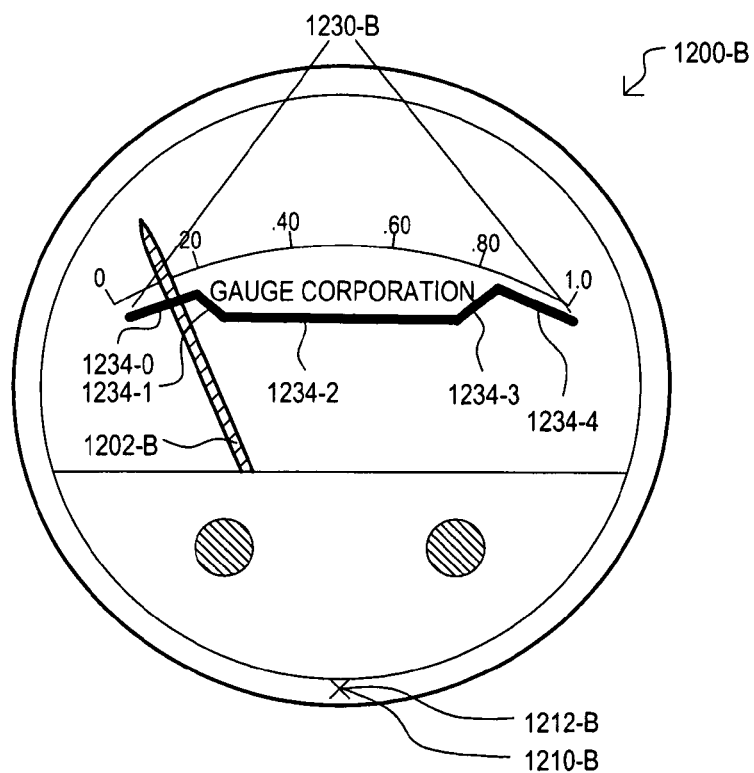

FIG. 12B shows a gauge 1200-B having a needle 1202-B, and image and anchor processing points (1210-B, 1212-B) like those in FIG. 12A. In the particular embodiment shown, an ROI 1230-B may be a region defined by line segments 1234-0 to 1234-4. Each of line segments (1234-0 to 1234-4) may be a set of pixels arranged generally along a defined slope. In a very particular embodiment, line segments may be defined with a pixel start location (SL) followed by a set of vectors, each vector corresponding to a line segment. In one embodiment, each vector may include a delta X (dX), a delta Y (dY) and count (n). Starting at SL, dX and dY may be added to determine a next pixel location. This is repeated "n" times to arrive at an end of a segment. A next segment may be defined by starting with a new vector at the end location of the previous segment.

Once an ROI has been defined, a needle position within such an ROI may be determined. From such a position, an angle may be calculated with respect to a processing anchor point.

In this way, region of interest may be defined in a gauge image to determine a gauge angle needle location.

Figure 13:
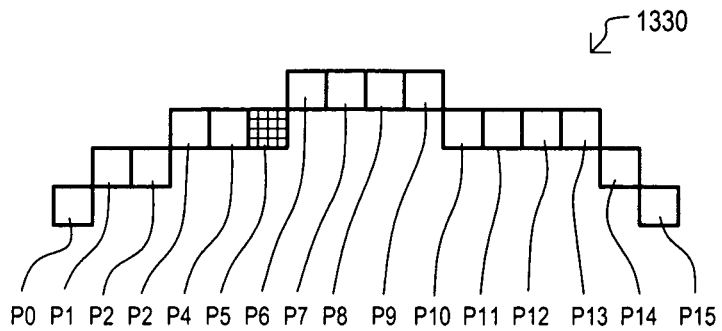
FIG. 13 is diagram showing an ROI according to an embodiment.

Referring now to FIG. 13, an ROI according one embodiment is shown in a diagram and designated by the reference character 1330. Such an ROI 1330 may be formed by a region defined by concentric circles, or by a number of line segments. ROI 1330 includes pixels P0 to P15. According to embodiments, starting at one end of a ROI 1330 (e.g., P0 or P15) and moving to the opposing end (e.g., P15 or P0), each pixel may be examined to determine if it is a needle pixel (i.e., contains an image of a gauge needle). FIG. 13 shows an embodiment where such a method has determined that a pixel P5 may be a needle pixel.

In one embodiment, if a needle has a different color than features in the ROI, a color filter may be used to identify a pixel(s) containing a needle.

In another embodiment, a luminosity threshold may be used. One very particular embodiment having this feature is shown in FIG. 14.

Figure 14:
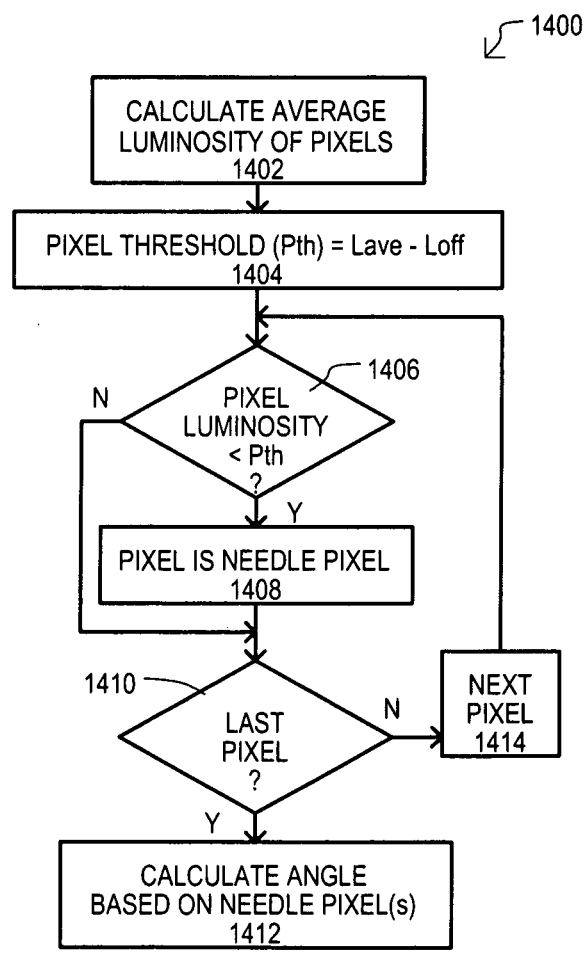
FIG. 14 is a flow diagram of a method according to an embodiment.

Referring to FIG. 14, a method 1400 may include calculating an average luminosity of pixels of an ROI (or sub-set of ROI) (box 1402). A pixel threshold may be established (box 1404). In the particular embodiment shown, a pixel threshold Pth may be an average luminosity Lave minus an offset Loff. If a pixel luminosity is less than Pth (Y from 1406) such a pixel may be determined to be a needle pixel (box 1408). A next pixel in an ROI may then be examined (box 1414). Once a last pixel of an ROI is reached (Y from 1410), an angle may be calculated based on the needle pixel (box 1412).

In particular embodiments, an ROI may be stored as a data structure in a system memory. In one very particular embodiment, an ROI may be an array structure, with array position corresponding to one coordinate (e.g., X position), and array element storing the other coordinate (e.g., Y position) as well as pixel value for examination (e.g., luminosity).

For gauges in which a color or luminosity alone may not be sufficient to detect a needle pixel within an ROI, edge detection may be used to find a gauge needle pixel. In one embodiment, known edge detection algorithms such as a Canny filter or Prewitt filter may be used to determine an edge of needle in an ROI.

In another embodiment, a method may distinguish a needle by detecting a suitable "dip" in pixel values. For example, if a needle is darker than a background, a dip represents a sudden transition from dark and back. In contrast, a "negative" dip may be a sudden transition from to light and back. Finally, dips may be distinguished from "edges" which may represent a transition from light to dark (or vice versa), where such a transition does not return to the previous luminosity within a set spacing.

To distinguish a desired dip from other transition types, a method may determine derivatives of pixels (differences between adjacent pixels), as an ROI is examined from one end to the other. Embodiments of such operations are shown in FIGS. 15A to 15C.

Figure 15A:
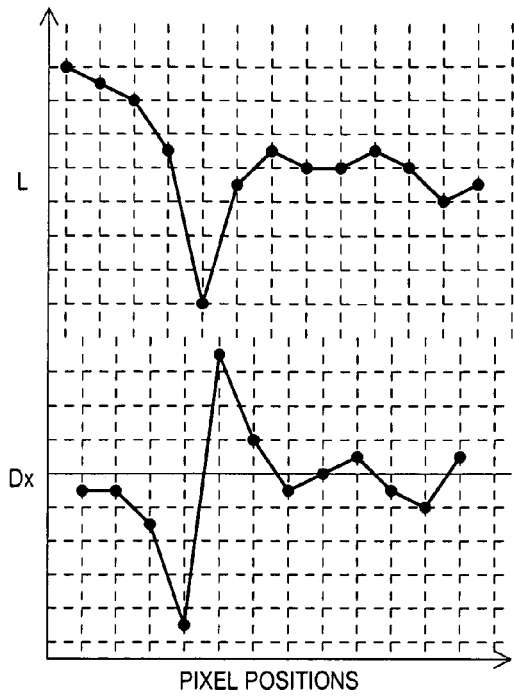
FIGS. 15A to 15C are embodiments of pixel data analysis according to embodiments.
Figure 15B:
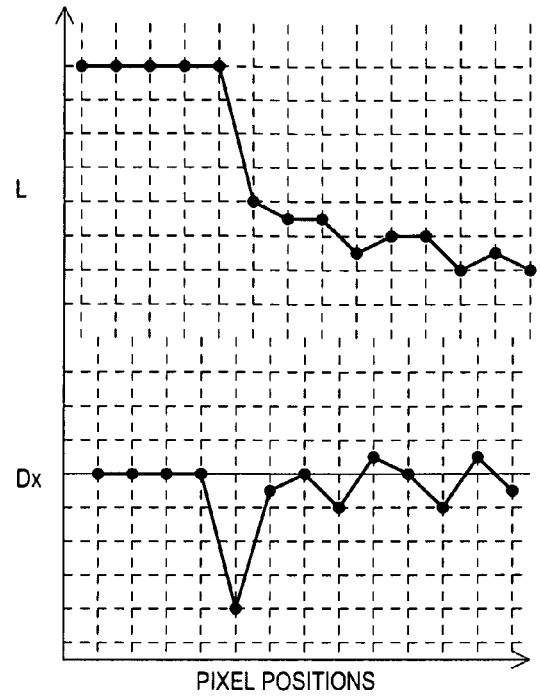
Figure 15C:
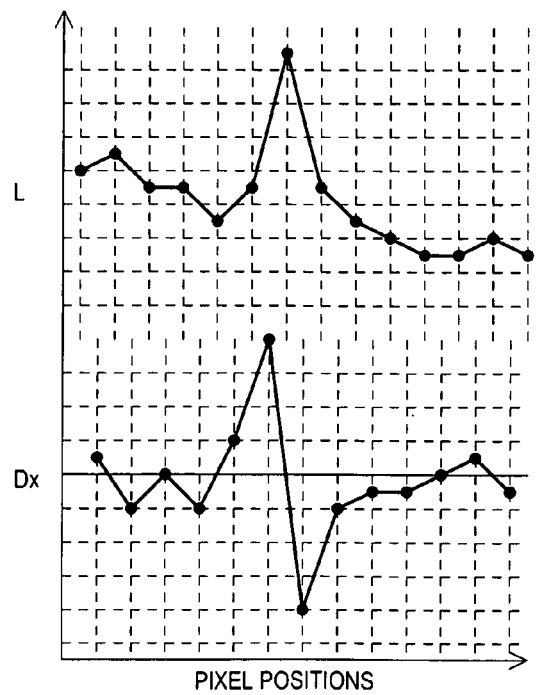

Referring to FIGS. 15A to 15C graphs of pixel data values for a portion of an ROI are shown. Each graph shows a luminosity values (L) of pixels, as well as derivatives (Dx) for adjacent pixel positions.

FIG. 15A shows one embodiment of a negative dip. As shown, Dx data shows a rapid change to darkness followed by a corresponding rapid change back to a lighter value. Such a negative dip may indicate a gauge needle position in cases where a gauge needle is mostly darker than a back ground.

FIG. 15B shows one embodiment of an "edge". The Dx data shows a negative change, but such a negative change is not accompanied by a rapid positive change.

FIG. 15C shows one embodiment of a positive dip. As shown, Dx data shows a rapid change to a lighter value followed by a corresponding rapid change back to a darker value. Such a positive dip may indicate a gauge needle position in cases where a gauge needle is mostly lighter than a back ground.

According to luminosity derivative data, a method may determine a needle position in an ROI. One particular embodiment of such method will now be described.

Figure 16:
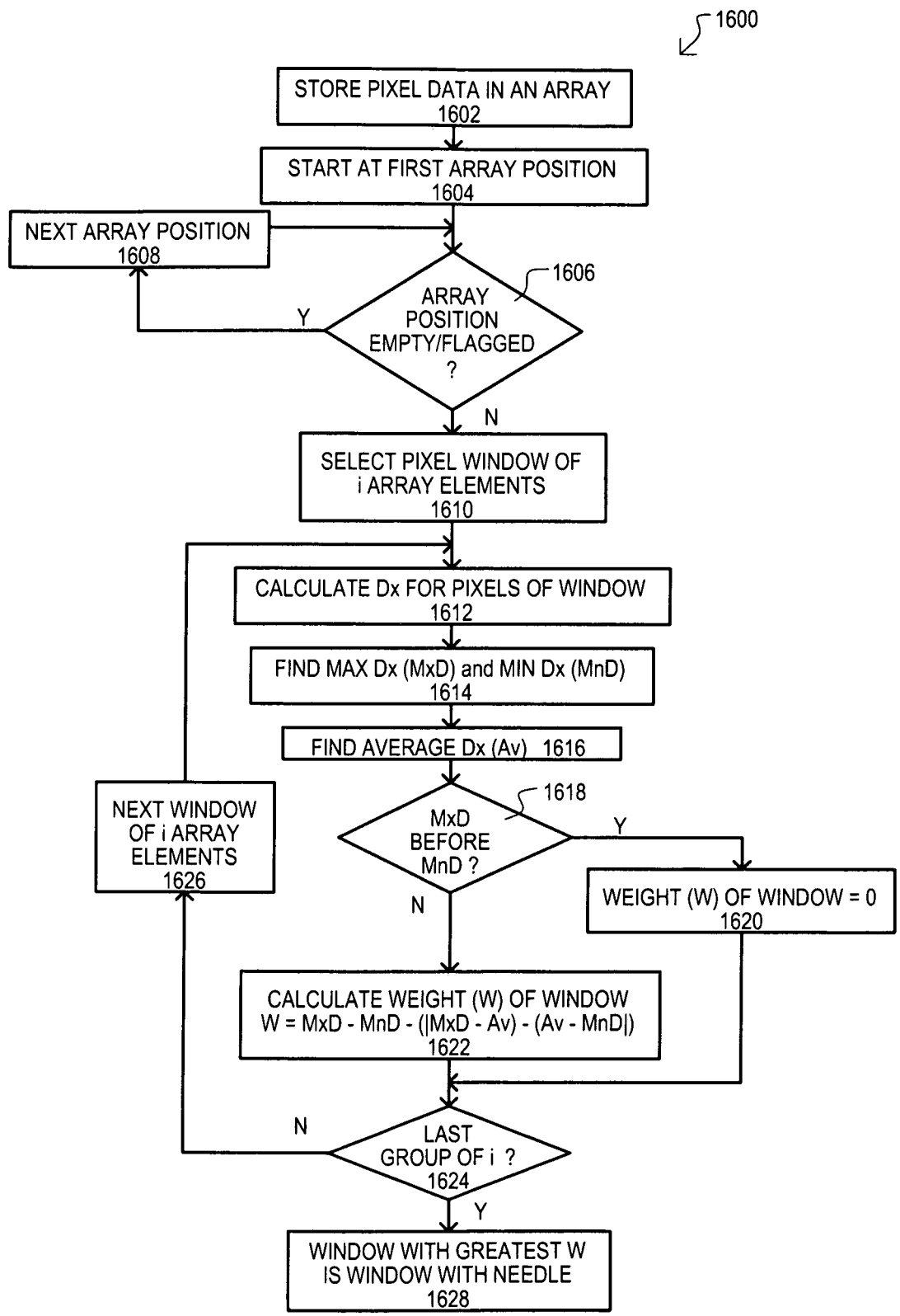
FIG. 16 is a flow diagram of a method according to an embodiment.

Referring to FIG. 16, a method 1600 may include storing pixel data in an array (box 1602). In one particular embodiment, such an operation may include storing pixels of an ROI in an array, where array position corresponds to a pixel's X position, and a Y position and luminosity of a pixel are stored in an array element. When an ROI does not match extents of an array (i.e., there are no pixels corresponding to X position at a start or end of an array), such array elements can be marked as empty or otherwise flagged. Use of an array may avoid the need to sort pixels.

A method 1600 may start at a first array position (box 1604). In this way, a method 1600 may work across an ROI from one end to the other. If an array position is empty or otherwise flagged (Y from 1606), a next position may be examined (box 1608). This may continue until a first valid pixel is found.

A method 1600 may select a first "pixel window" of i array elements (box 1610). For each element in the window, a Dx between adjacent pixels may be calculated (moving in a same direction) (box 1612). For the Dx values within the pixel window, a maximum (MxD) and minimum (MnD) Dx value may be determined (box 1614). An average Dx (Av) may also be determined (box 1616). It is noted that a pixel window for an average Dx value (Av) may be derived from more than "i" array elements (i.e., pixels). Such an arrangement may make a method less susceptible to noise.

A weight may then be assigned to a window if "i" gauge image pixels. A weight may represent a likelihood that the pixels of the window include the gauge needle. In the embodiment of FIG. 16, it is assumed that a needle is generally darker than a background. Accordingly, to filter out "positive dips" (i.e., sudden increases in luminosity), a method may set a window weight value (W) to zero (box 1620) if an MxD value precedes and MnD value (Y from 1618) within the window. However, if an MxD value follows and MnD value (indicating a "negative dip"), a weight value (W) may be calculated (box 1622).

In the very particular embodiment of FIG. 16, a weight value (W) may be calculated according to $$W = MxD - MnD - (|(MxD - Av) - (Av - MnD)|).$$

The term "MxD−MnD" will vary according to the change in luminosity. Such a value may vary for edges, positive dips and negative dips in the same manner. In contrast, the term "|(MxD−Av)−(Av−MnD)|" decreases the weight in the event of an edge. If a one slope (e.g., MxD) is not accompanied by a correspondingly large opposite slope (e.g., MnD), then a weight will be reduced.

Once a weight value (W) for a window has been determined, a next window may be examined (box 1626). Once a last window has been reached (Y from box 1624), a window having a largest weight may be considered a window with a needle pixel (box 1628). If more than one window have equal weight, a "winning" window may be selected arbitrarily, or may be selected based on a previous processing result, or may selected based on a processing result of a redundant ROI.

Once a window having a greatest weight has been determined, a pixel position within such a window may be selected as a needle location. Various embodiments for selecting a needle position within a highest weight window will now be described.

Figure 17A:
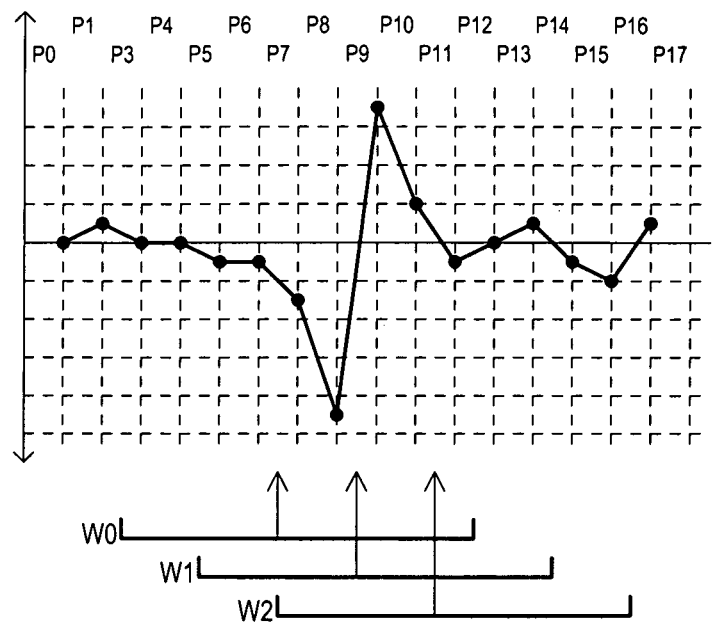
FIGS. 17A and 17B are embodiments of pixel data analysis according to embodiments.

In one embodiment, a center pixel position within a window may be selected as a needle position pixel. Such an arrangement is shown in FIG. 17A. FIG. 17A shows three windows W0, W1, and W2. In the case of window W0, pixel P7 may be determined to be a needle location. In the cases of windows W1 and W2, pixels P9 and P11, respectively, may be determined to be needle locations.

Figure 17B:
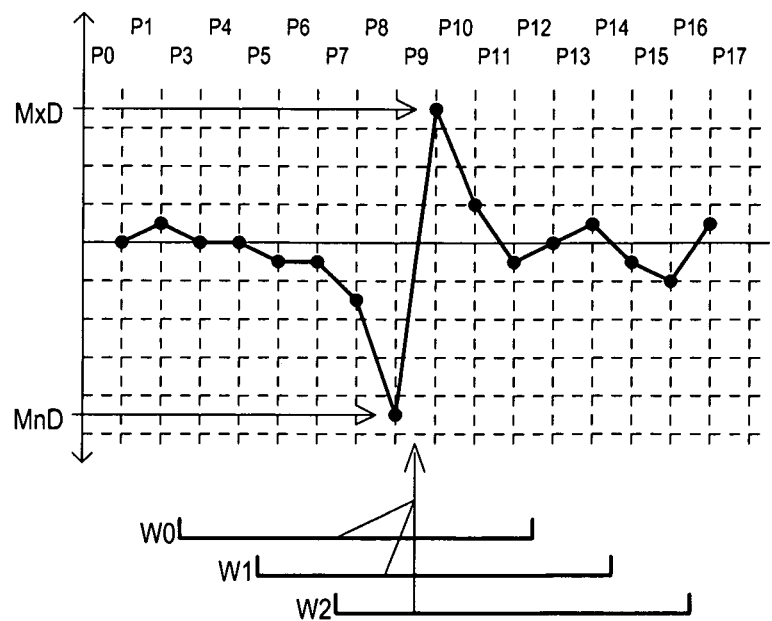

In another embodiment, a needle position pixel may be that pixel situated between MnD and MxD values of the window. Such an arrangement is shown in FIG. 17B. FIG. 17B shows an MnD occurring at the transition from pixel P8 and P9, and an MxD occurring at the transition from pixel P9 to P10. Accordingly, pixel P9 may be selected as a needle position pixel. It is noted that the embodiment of FIG. 17B also shows three windows W0, W1 and W2. In this embodiment, pixel P9 may be selected even in the event all windows (W0-W2) have an equal weight value (W).

In this way, pixel locations in an ROI may be grouped into windows and weighted based on luminosity transitions within such windows. A highest weighted window may be determined to have a needle position.

While dips may be used to indicate a needle position, a contrast between a needle and its background may vary according to an overall brightness of an acquired image. Further, a needle contrast may vary according to needle speed, with a fast needle having less contrast than a slow needle. According to particular embodiments, a dip results may be filtered depending upon a brightness value to help optimize valid dip detection.

Referring to FIGS. 18A and 18B, a contrast filter may be included to ensure that a detected dip is a valid needle position. FIG. 18A shows a graph for a static contrast threshold. FIG. 18A shows a graph with needle contrast versus brightness for a slow needle 1802 and a fast needle 1804. In such an embodiment, any reading falling below a static contrast level 1806 will not be considered a valid "dip". FIG. 18B shows a graph for a dynamic contrast threshold. FIG. 18B shows a same needle response as FIG. 18A, however, a dynamic contrast level 1806' may now be used to filter out invalid dips.

In this way, a contrast level may be filtered to ensure variations in contrast arising from variations in brightness and differences in needle speed.

According to embodiments herein and equivalents, sets of pixel positions can be derived that indicate positions of a needle location. In particular embodiments, such pixel positions may be filtered to reduce such a pixel set and then generate a needle angle value.

Referring now to FIG. 19, a method 1900 for filtering needle pixel positions and generating a needle angle will now be described. A method 1900 may include calculating an average X value (Xav) and Y value (Yav) for all pixel values of a pixel set (box 1902). Each pixel value may then be subject to a distance filter (box 1904). In the embodiment of FIG. 19, if a pixel X value is farther from an average value by an offset (e.g., X>Xav+Xoffset), such a pixel will be discarded from subsequent processing steps. Similarly, if a pixel Y value is farther from an average value by an offset (e.g., Y>Yav+Yoffset), such a pixel will be discarded from subsequent processing steps. In the very particular embodiment of FIG. 19, if a desired precision is not met (N from 1906), boxes 1902 and 1904 may be repeated with the reduced pixel set (assuming pixels are discarded according to filtering 1904). If a desired precision is met (Y from 1906), an angle value may be calculated (1908). In the particular embodiment shown, an arctangent (arc tan) function may be executed on value Yav/Xav (offset by the image anchor point, if necessary). In one embodiment, such an arc tan function may be implemented as a scaled lookup table to avoid the need for a floating point processing operation.

Figure 20:
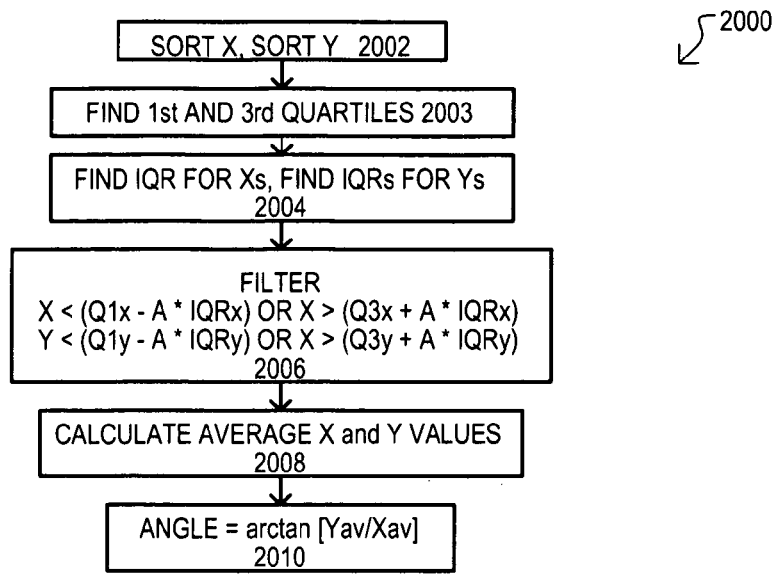
FIG. 20 is a flow diagram of a method according to an embodiment.

Referring now to FIG. 20, another method 2000 for filtering needle pixel positions and generating a needle angle will now be described. A method 2000 may include sorting X and Y positions of pixel locations according to value (box 2002). For such sorted values first quartiles (Q1) and third quartiles (Q3) may be determined (box 2003). A first quartile Q1 may be a data point ¼ through a sorted data set. A third quartile Q3 may be a data point ¾ through a sorted data set. An interquartile range (IQR) may also be calculated (box 2004). An IQR may be Q3-Q1. Each pixel value may then be examined and filtered based on quartile values (box 2006). In the embodiment of FIG. 20, if a pixel X value is less than the first quartile by a predetermined factor (A*IQRx), or greater than a third quartile by the factor, such a pixel will be discarded from subsequent processing steps. A value "A" may be a variable amplification factor which may be larger for less strict filtering, or smaller for tighter filtering. A same type of filtering may be performed based on Y values. A method 2000 may also include calculating an average X value (Xav) and Y value (Yav) for the filtered set of points (box 2008). An angle may be calculated (box 2010) in a same fashion as box 1908 of FIG. 19, or an equivalent way.

Figure 21:
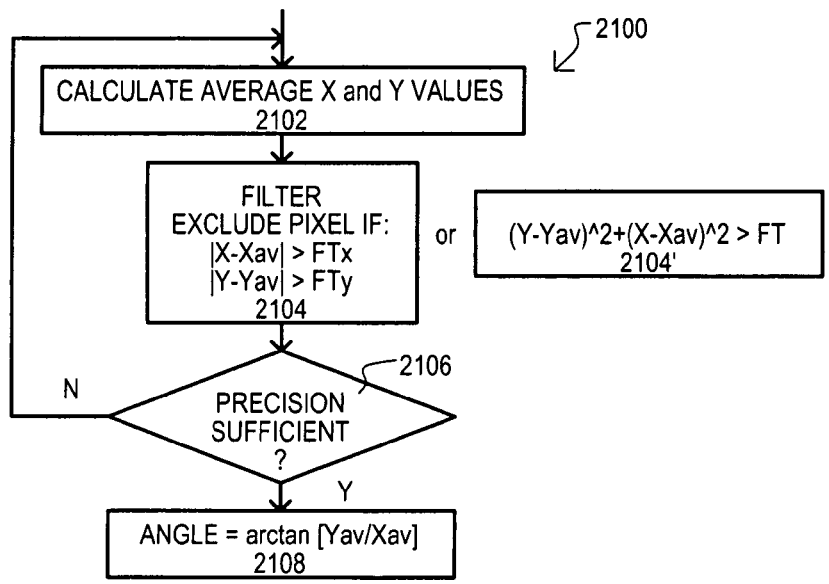
FIG. 21 is a flow diagram of a method according to an embodiment.

Referring now to FIG. 21, a further method 2100 for filtering needle pixel positions and generating a needle angle will now be described. A method 2100 may include calculating an average X value (Xav) and Y value (Yav) for all pixel positions of a set (box 2102). Each pixel value may then be filtered (box 2104). In the embodiment of FIG. 21, if a difference between a pixel X value and Xav is larger than a filter window value FTx, such a pixel will be discarded from subsequent processing steps. Similarly, if a difference between a pixel Y value and Yav is larger than a filter window value FTy, such a pixel will be discarded from subsequent processing steps. In an alternate embodiment, a total distance between a pixel value and average may be calculated (box 2104'). It is noted in an action like that of box 2104', while actual pixel distance may be calculated by taking a square root of the distance, in the embodiment shown, such values may be retained in squared form for reduced calculation steps. If a desired precision is not met (N from 2106), boxes 2102 and 2104 may be repeated with the reduced pixel set. If a desired precision is met (Y from 2106), an angle value may be calculated (2108) in a same fashion as box 1908 of FIG. 19, or an equivalent way.

While filter values FT noted in FIG. 21 may be constant values, in other embodiments, calculations may be repeated and FT values modified dynamically. In particular, a method like that of FIG. 21 may be performed with a first FT value to arrive at an initial angle. Based on such an angle, a new FT value may be generated. An embodiment of such a dynamic FT values is shown in FIG. 22.

Figure 22:
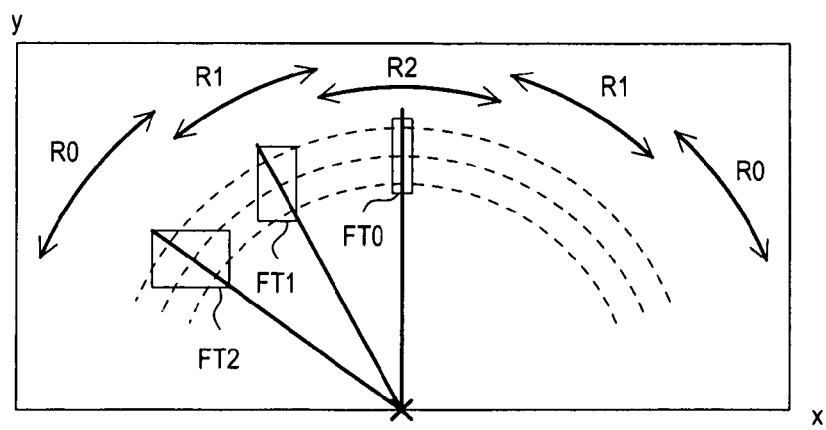
FIG. 22 is a diagram showing a dynamic pixel position filter according to an embodiment.

FIG. 22 shows how filter values FT may vary according to a region of an initial angle. In particular, in a region 2 (R2), an FTx value may be considerably smaller than an FTy value.

However, in other regions R0 and R1, values FTx and FTy may be increased to account for needle pixel distributions changing according to needle angle.

In this way, once pixel values for a gauge needle have been determined, such values may be further filtered and a needle angle generated from such values.

While the present invention may include methods for determining a gauge reading, other embodiments may include gauge reader devices and systems for generating a gauge reading, and/or methods for monitoring systems that includes such gauge readers device. Various such embodiments will now be described.

While the above embodiments have described methods that acquire an image from a direction perpendicular to (or substantially perpendicular) to a gauge face, other embodiments may acquire an image at non-perpendicular angles to a gauge face.

FIG. 22A shows an image of a gauge 2200-A taken perpendicular to the gauge face. In FIG. 22A, a gauge may include a reading needle 2202 (i.e., a needle from which a gauge reading is determined). However, a gauge 2200-A may further include set point needles 2240-0 and 2240-1. In some image processing approaches it may be difficult to differentiate between set point needles (2240-0 and 2240-1) from reading needle 2202.

In one particular embodiment, when a reading needle 2202 has a different color than set point needles (2240-0 and 2240-1), a color filtering step may be implemented after pixel data is acquired, to filter out set point needle pixels. An angle for reading needle 2202 may then be derived according to the embodiments shown herein or equivalents.

In another embodiment, set point needles (2240-0 and 2240-1) may cast different shadows than a reading needle 2202. In such an embodiment, different light sources may generate different shadows for various needle types. A method may process signatures of such shadows to determine which is a reading needle versus which is a set point needle. In one particular embodiment, a needle with a smallest shadow offset may be further from the light sources.

In a further embodiment, as shown in FIG. 22B, an image of a gauge 2200-B may be acquired at an angle to thereby distinguish positions of a reading needle with respect to set point needles. In particular, when a reading needle rotates in a different plane than the set point needles, its position will be distinguishable from such set point needles when viewed from an angle. FIG. 22B shows an example when a reading needle 2202 is directly behind a set point needle 2240-0. In a non-angled view, like that of FIG. 22A, it may be difficult to distinguish the reading needle 2202 from the set point needle 2240-0. However, as shown in FIG. 22B, when viewed at an angle, it is easily determined that reading needle 2202 is behind set point needle 2240-0 and not set point needle 2240-1.

Accordingly, in one very particular embodiment, when a reading needle 2202 is not aligned with a set point needle, it may be determined to be the line interest due to differences with the set point needles (2240-0 and 2204-1), such as color or size, as but two examples. When reading needle 2202 is aligned with a set point needle (2240-0 and 2204-1), an angled view may be sampled. The position having two lines at such an angled view is understood to be the appropriate reading.

Referring to FIGS. 23 and 24, embodiments of gauge reader devices that may acquire an image of a gauge at an angle will now be described.

Referring to FIG. 23, a gauge reader device according to one embodiment is shown in a cross sectional view and designated by the general reference character 2300. A gauge reader device 2300 may be mechanically connected to a gauge 2342. A gauge reader device 2300 may position an image sensor 2346 at a non-perpendicular angle with respect to a face of gauge 2342. In the very particular embodiment shown, a gauge reader device 2300 may include a monitoring section 2344-0 and an adapter section 2344-1. A monitoring section 2344-0 may include gauge reading device electronics for acquiring and processing an image into a gauge reading. An adapter section 2344-1 may angle monitoring section 2344-0 with respect to gauge 2342.

Referring to FIG. 24, a gauge reader device according to another embodiment is shown in a cross sectional view and designated by the general reference character 2400. A gauge reader device 2400 may be mechanically connected to a gauge 2442. A gauge reader device 2400 may include a mirror 2448 for providing an angled view of a gauge 2442. In the very particular embodiment shown, a gauge reader device 2400 may include a monitoring section 2444-0 and an adapter section 2444-1. A monitoring section 2444-0 may include gauge reading device electronics for acquiring and processing an image into a gauge reading. An adapter section 2444-1 may include mirror 2448.

It is understood that while FIG. 24 shows an arrangement in which an image sensor captures both a gauge image and a reflected gauge image, other embodiments may include gauge readers having an image sensor that only captures an angled reflection of a gauge.

In this way, a gauge reader device may acquire a gauge image at an angle to distinguish set point needles from a reading needle.

While embodiments above have shown how a reading needle may be distinguished from a set point needle by acquiring an angled image of a gauge, in other embodiments, a gauge reader may include multiple image sensors to acquire a stereo view of such a gauge. According to variances in needle position, set point needles may be distinguished from reading needles. In one very particular embodiment, when a reading needle is behind a set point needle, a set point needle may have greater variance in position between two images.

Referring to FIG. 25, a gauge reader device according to another embodiment is shown in a cross sectional view and designated by the general reference character 2500. A gauge reader device 2500 may be mechanically connected to a gauge 2542. A gauge reader device 2500 may include two image sensors 2546-0 and 2546-1. In the very particular embodiment shown, a gauge reader device 2500 may include a monitoring section 2544-0 and an adapter section 2544-1. A monitoring section 2544-0 may include gauge reading device electronics for acquiring and processing an image into a gauge reading. An adapter section 2544-1 may physically connect monitoring section 2544-0 to gauge 2542.

In this way, a gauge reader may include more than one image sensor to acquire two different images that may distinguish set point needles from reading needles.

As noted above, embodiments of the invention may include various methods for performing any of: acquiring gauge image data, filtering gauge image data, transforming gauge image pixel locations into an angle value, and/or transforming an angle value derived from gauge image pixel data into a gauge reading. In very particular embodiments, any such methods may be undertaken by a processor executing instructions stored in one or more machine readable media included within a self-contained gauge reader device.

Referring now to FIG. 26, a gauge reader device according to one embodiment is shown in a block schematic diagram and designated by the general reference character 2600. A gauge reader 2600 may include an image sensor 2646-0 (and optionally, one or more additional image sensors 2646-1 for an embodiment like that of FIG. 25) and a control section 2650. In the particular embodiment shown, a control section 2650 may include a microcontroller (MCU) 2650-0 as well as memory 2650-1. An MCU 2650-0 may include a processor for executing instructions that may be stored in dedicated processor memory, in memory 2650-1, or in both as but a few examples. In response to such instructions, an MCU 2650-0 may generate control signals on control signal paths 2652 to control the operation image sensor(s) 2646-0 (and optionally 2646-1). The embodiment of FIG. 26 also shows an address/data bus 2654 that may allow image sensor(s) 2646-0/1 and MCU 2650-0 to access memory 2650-1. It is understood that MCU 2650-0 could access memory 2650-1 via a bus separate from that utilized by image sensor(s) 2646-0/1. Still further such address/data buses may allow for the transfer of data in a serial, and/or parallel fashion. An image sensor 2646-0/1 may transfer image data to memory 2650-1. Such a transfer may involve an entire image, or a portion of an image.

An MCU 2650-0 may execute instructions stored in an internal memory and/or memory 2650-1 that includes any of the method embodiments shown herein, or equivalents.

In this way, a gauge reader device may include a self-contained processor and memory for acquiring a gauge image, and transforming such an image into a gauge reading.

While embodiments described above may include gauge reading methods and devices, still other embodiments may include systems including and interconnecting such gauge reader devices and methods. One such embodiment is shown in FIG. 27.

Figure 27:
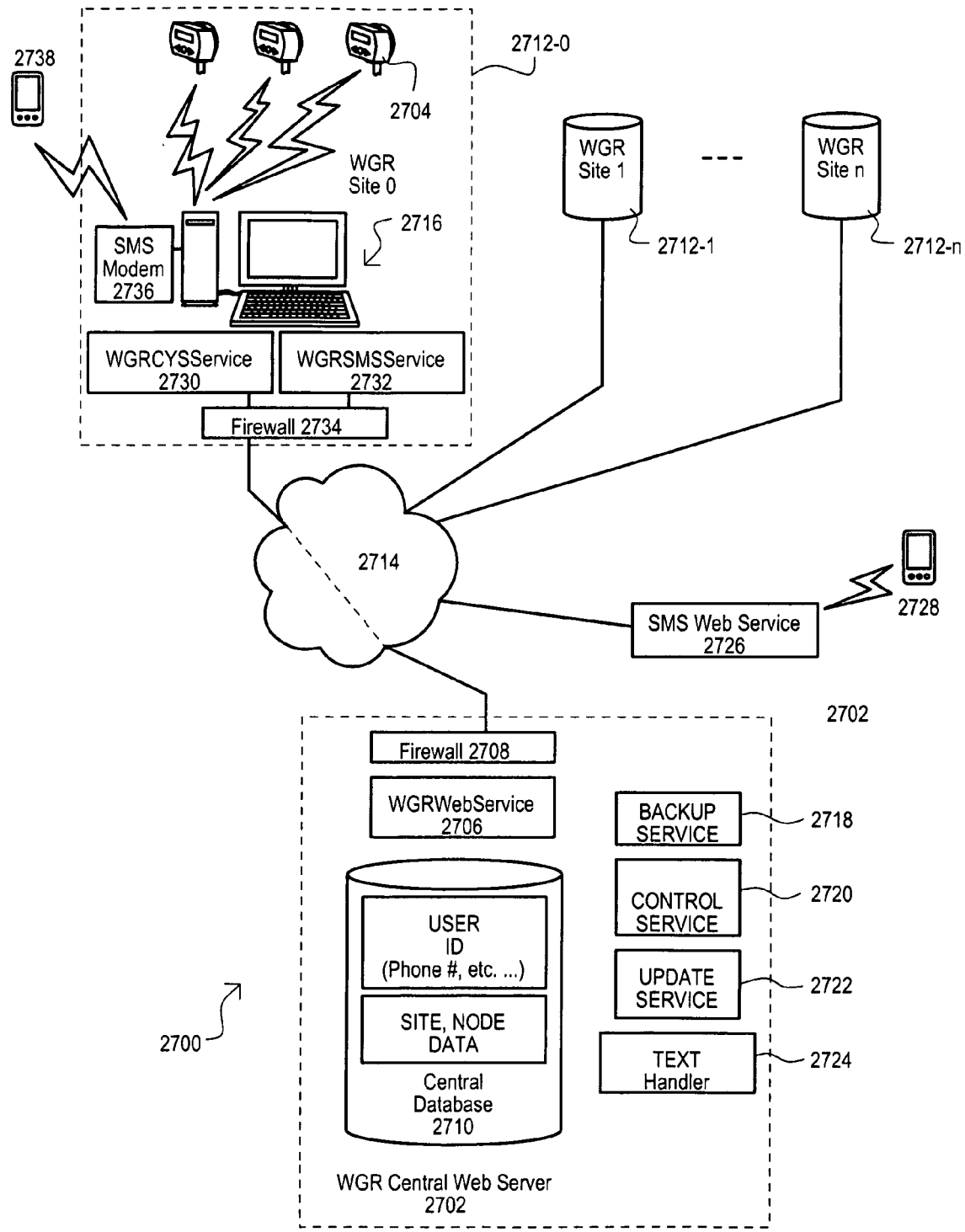
FIG. 27 is a block diagram of a system according to an embodiment.

Referring to FIG. 27, a system according to an embodiment is shown in a block diagram and designated by the general reference character 2700. A system 2700 may include central server 2702. A central server 2702 may provide a central location for monitoring numerous gauge reader devices (one shown as 2704) located at sites remote from central server 2702. In such an arrangement, gauge reader values may be periodically received, stored and made accessible to users in a variety of communication methods.

In the very particular embodiment of FIG. 27, a central server 2702 may include a remote site service 2706, a firewall 2708, and a central database 2710. A remote site service 2706 may interact with remote sites (any of 2712-0 to 2712-n) through firewall 2708 by way of a network 2714. In particular, a remote site service 2706 may receive "node" data from sites (any of 2712-0 to 2712-n). Node data may include gauge readings generated according to any of the embodiments herein, or equivalents. In one particular embodiment, a remote site service may be a simple object access protocol (SOAP) based web service hosted by central server 2702 that may access remote site device (one shown as 2716) via the Internet (i.e., network 2714 may be the Internet).

A central database 2710 may store information related to remote sites (any of 2712-0 to 2712-n). In the particular embodiment of FIG. 27, a central database 2710 may store site data 2710-0 and user data 2710-1. Site data 2710-0 may include, but is not limited to, status and data provided by various nodes at accessed sites (any of 2712-0 to 2712-n). User data 2710-1 may include data for identifying users when central server 2702 is accessed, and for forwarding data to users via other networks, such as text message data, as will be described in more detail at a later point herein. In one very particular embodiment, a central database 2710 may be an SQL server database.

A central server 2702 may be passive, responding to communications from behind firewalls at remote sites (any of 2712-0 to 2712-n). In one embodiment, a central server 2702 may maintain an open communication port. Remote sites (any of 2712-0 to 2712-n) may initiate messages to such a port. Such messages may include data (i.e., push data), or may include a poll message. A poll message may enable central server 2702 to respond through a remote firewall, as it is the remote site that has initiated the request. In one very particular embodiment, a remote site service 2706 may be a web service, and remote sites may access such a service via http at the appropriate communications port (i.e., port 80).

In this way, a secure bi-directional data path may be created to central server 2702 through a remote site firewall.

A central server 2702 may include additional services that may form part of, or be separate from, remote site service 2706. In the embodiment of FIG. 27, central server 2702 may include a backup service 2718, a control service 2720, an update service 2722 and a text message handling service 2724. A backup service 2718 may backup data received from remote sites. Such a backup service 2718 may be periodically executed by accessing remote sites and/or may be in response to remote site requests. In particular embodiments, backup data may be stored on at least central database 2710.

A control service 2720 may access remote sites to thereby control remote devices (e.g., 2716) at such sites. Such a service may enable diagnosis and troubleshooting of the remote device (e.g., 2716) and/or node devices (e.g., gauge readers 2704) in communication with such remote device. In a similar fashion, an update service 2722 may enable instruction data to be updated on remote devices (e.g., 2716) and/or node devices (e.g., gauge readers 2704).

A text message handling service 2718 may be in communication with a text message service 2726 (described at a later point herein), and may receive text message data, send text message data, archive text message data, and provide user data to a text message service 2726.

A text message service 2726 may be hosted by a different server than central server 2702. In alternate embodiments, however, such a service may be hosted by central server 2702. In particular embodiments, a text message service 2726 may be part of system 2700, but in other embodiments may not be part of system 2700. A text message service 2726 may transfer text message data between remote sites (any of 2712-0 to 2712-n) and an endpoint 2728 of a text message network, such as a cell phone or the like. In one particular embodiment, in response to predetermined events, a remote site (any of 2712-0 to 2712-n) may issue an alarm. Such an alarm may be sent directly to text message service 2726 via network 2714, or alternatively, may be sent to text message handler 2724 within central server 2702, which may then forward an alarm to text message service 2726. Text message service 2726 may then forward a predetermined text message to endpoint 2728.

In addition or alternatively, commands may be sent from an endpoint 2728 that are intended for a remote site (any of 2712-0 to 2712-n). In one particular embodiment, a command text message received by text message service 2726 may be forwarded to central server 2702 and handled by text message handling service 2718. In response to such a command text message, central server 2702 may wait for an appropriate polling message from a remote site, and then forward the command to the remote site in response. As but one very particular embodiment, in response to a text message command a remote site may push data for a node, including a captured gauge image, to an endpoint 2728, and/or allow central server 2702 to pull such data from the remote site.

A text message service 2726 may store, or have access to, user data 2710-1 to thereby ensure any given endpoint may only access predetermined remote site(s). In one particular embodiment, a text message service 2726 may be an SMS web service.

Referring still to FIG. 27, one embodiment of a remote site 2712-0 will now be described. In some embodiments, any of remote sites (2710-0 to 2710-n) may form part of system 2700. However, in alternate embodiments remote sites are separate from a system 2700.

A remote site (e.g., 2712-0) may include a one or more gauge readers (one shown as 2704) connected directly, or indirectly, to a remote device 2716. In a very particular embodiment, a gauge reader may be a wireless gauge reader (WGR) and a remote device may be a remote'site server. WGRs (e.g., 2704) may transmit gauge reading and image data to a site server 2716, via a direct wireless communication path, or via one or more wireless signal repeaters (not shown).

A site server 2716 may include a local site service 2730 and a local text service 2732. A local site service 2730 may interact with a remote site service 2706 through a local firewall 2734 to provide access to WGR data. A local text service 2732 may interact with text message service 2726 and/or a text message handler 2724 to enable text messages to be sent from, or received by, the remote site 2712-0.

While the above has described an embodiment in which text messages may be transferred via a text message service 2726, in other embodiments, a local site may alternatively (or in addition) include a local text message modem 2736. A local text message modem 2736 may enable a local device 2716 (e.g., local server), to directly send text messages to, and receive text messages from, an endpoint 2738 of a corresponding text message network.

Figure 28:
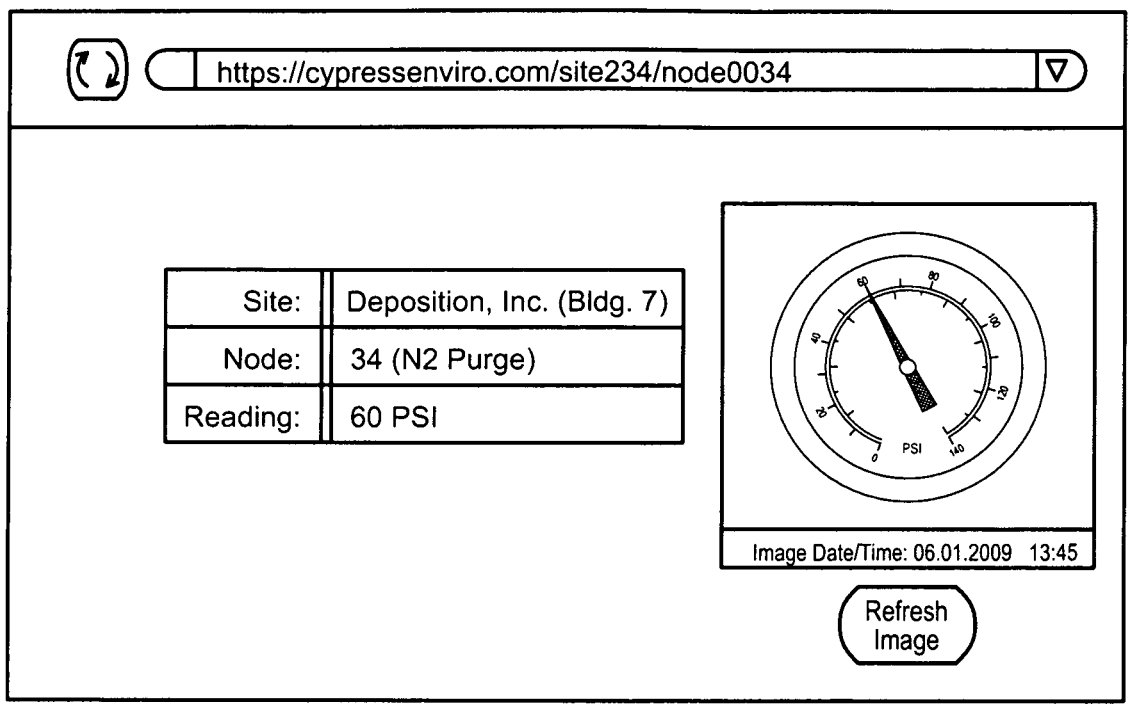
FIG. 28 is a block diagram a web page provided by a system like that of FIG. 27.

In particular embodiments, a remote site service 2706 may provide web pages based on stored node data, and/or concurrent node data. Such a feature may allow users to access data from nodes of remote sites. In very particular embodiments, such a web page may include an image of a gauge that is refreshable. One embodiment of such a web page is shown in FIG. 28.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of an embodiment may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A method of reading a gauge, comprising:
identifying a region of interest (ROI) including a plurality of pixels, wherein the ROI overlaps at least a portion of a gauge feature, and wherein the ROI includes a subset of the plurality of pixels;
capturing a digital image of the gauge using a gauge reading device attached to the gauge, the digital image comprising the plurality of pixels;
determining an angle of the gauge feature based on the plurality of pixels in the ROI, wherein the angle is calculated with respect to an anchor point;
converting the angle into a gauge reading, and
the gauge feature comprises a needle; and
determining the angle further includes
determining an initial angle of the needle from the image pixel locations;
if the initial angle is outside predetermined limits, rotating all the pixel locations in a first direction about the anchor point by a displacement angle, determining a rotated angle of the needle from the rotated image pixel locations, and modifying the rotated angle by the displacement angle to generate the angle of the gauge feature.

2. The method of claim 1, wherein:
determining the angle further includes
determining differences between line pixel locations and locations of the predetermined pixels of the digital image, and
determining the angle of the gauge feature based on the differences between the line pixel locations and the locations of the predetermined pixels of the digital image.

3. The method of claim 1, wherein:
determining the angle of the gauge feature based on the differences between the line pixel locations and the locations of the predetermined pixels of the digital image includes
selecting one of the plurality of lines as a best fit line when the line has the smallest difference between predetermined line pixel locations and predetermined image pixel locations, and
assigning an angle of the best fit line as the angle of the gauge feature.

4. The method of claim 2, wherein:
determining the angle of the gauge feature based on the differences between the line pixel locations and the locations of the predetermined pixels of the digital image includes
selecting one of the plurality of lines as a best fit line when the line has a largest number of predetermined image pixel locations within a location difference range from line pixel locations; and
assigning an angle of the best fit line as the angle of the gauge feature.

5. The method of claim 1, wherein:
determining the angle of the gauge feature includes
storing at least position and intensity values for each pixel in the ROI,
assigning a pixel location as a pixel needle position based on variance in intensity within the ROI, and
calculating the angle of the gauge feature from the location of the pixel needle position.

6. The method of claim 5, wherein
the ROI comprises pixel locations having X and Y coordinate locations within the digital image, and
storing at least position and intensity values for each pixel in the ROI includes
forming an array, and
storing Y locations and intensity values at each location of the array, each array location corresponding to a different X coordinate of the X and Y coordinate location.

7. The method of claim 5, wherein:
starting at one end of the ROI,
determining an intensity difference between adjacent pixels of the ROI, averaging intensity difference for groups of adjacent pixels of the ROI,
and
assigning a pixel location as a pixel needle position based on a greatest increase in intensity difference and a greatest decrease in intensity difference with respect to one of the average intensity differences.

8. The method of claim 5, wherein:
establishing the ROI includes defining a plurality of line segments, each comprising a plurality of pixels, the plurality of segments forming the ROI.

9. The device of claim 8, wherein:
capturing the digital image of the gauge includes capturing an image that includes a reading needle and a set point needle, the reading needle being the gauge feature; and
determining the angle of the gauge feature includes distinguishing pixels corresponding to the set point needle from pixels corresponding to the reading needle.

10. A gauge reader system, comprising:
at least one gauge reader device that includes an adapter section that couples to a gauge,
at least one image sensor that acquires image data of the gauge, the image data comprising a plurality of pixels,
an angle determination section that identifies a region of interest (ROI) that overlaps at least a portion of the gauge feature, determines an angle corresponding to a gauge feature based on a plurality of pixels of the ROI, wherein the angle is calculated with respect to an anchor point,
a conversion section that transforms the angle into a gauge reading, and
the at least one gauge reader further includes a processor, and
the angle determination section comprises an angle determination routine embodied on a machine readable media executable by the processor, including instructions for
determining an initial angle of a gauge needle from the image data, if the initial angle is outside of a predetermined range, rotating all the pixel locations in a first direction about a predetermined position by a displacement angle, determining a modified angle for the gauge needle, and determining a gauge needle angle from the modified angle and the displacement angle.

11. The system of claim 10, wherein:
the at least one gauge reader further includes a processor, and
the angle determination section comprises an angle determination routine embodied on a machine readable media executable by the processor, including instructions for
generating the line pixel positions for the plurality of lines at different angles, and comparing predetermined pixel positions of each line to predetermined pixel positions of the gauge image.

12. The system of claim 11, wherein:
the angle determination routine further includes instructions for matching one of the plurality of lines with a gauge needle orientation based on a minimum distance between the predetermined pixel positions of the gauge image and the matching line, and
setting the angle of the matching line as the angle for translation into the gauge reading.

13. The system of claim 11, wherein:
the angle determination routine further includes instructions for
matching one of the plurality of lines with a gauge needle orientation based on a distance range between predetermined pixel positions of the gauge image and the matching line, and
setting the angle of the matching line as the angle for translation into the gauge reading.

14. The system of claim 10, further including
a central web server system that monitors gauge readers at locations remote from the web server system, the web servers system comprising
a data base, and
a web service that accesses site data from the gauge readers through a firewall in response to poll requests from remote locations and stores such data in a database, the site data including at least gauge identifying data and gauge reading, and provides web pages for providing the site date.

15. The system of claim 14, further including:
a text message sending system coupled to receive predetermined notifications from a site, and forwarding corresponding text messages to network endpoints in response to such notifications.

16. A gauge reading system, comprising:
at least one gauge reader in communication with a site server, the gauge reader being a self-contained device comprising
an image sensor that acquires an image of a corresponding gauge,
an image processor that identifies a region of interest (ROI) including a plurality of pixels, wherein the ROI overlaps at least a portion of a gauge needle, and determines an angle of the gauge needle based on the plurality of pixels, wherein the angle is calculated with respect to an anchor point, determining the angle further includes determining an initial angle of the needle from the image pixel locations;
if the initial angle is outside predetermined limits, rotating all the pixel locations in a first direction about the anchor point by a displacement angle, determining a rotated angle of the needle from the rotated image pixel locations, and modifying the rotated angle by the displacement angle to generate the angle of the gauge feature; and
a central web server coupled to the site server by a communication firewall to receive at least gauge readings from the gauge reader device in response to predetermined requests from the site server.

17. The system of claim 16, wherein:
the central web server includes a monitoring service that periodically stores readings from a plurality of gauges for access via a network.

18. The system of claim 16, further including:
a text message service that forwards text message to predetermined network end points in response to at least a gauge reading, and forwards text messages from network endpoints to the central web server; and the central web server forwards received text message data in response to a poll request from the site server.

* * * * *